US012572173B2

(12) United States Patent
Choi et al.

(10) Patent No.: US 12,572,173 B2
(45) Date of Patent: Mar. 10, 2026

(54) WEARABLE DEVICE AND POWER DISTRIBUTION METHOD IN WEARABLE DEVICE

(71) Applicant: Samsung Electronics Co., Ltd., Suwon-si (KR)

(72) Inventors: Kyusik Choi, Suwon-si (KR); Seungnyun Kim, Suwon-si (KR); Dongil Son, Suwon-si (KR); Jongmin Yoon, Suwon-si (KR); Seungjoo Lee, Suwon-si (KR); Gisoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/516,138

(22) Filed: Nov. 21, 2023

(65) Prior Publication Data

US 2024/0168522 A1 May 23, 2024

Related U.S. Application Data

(63) Continuation of application No. PCT/KR2023/018745, filed on Nov. 21, 2023.

(30) Foreign Application Priority Data

Nov. 21, 2022 (KR) ........................ 10-2022-0156182
Nov. 24, 2022 (KR) ........................ 10-2022-0159684

(51) Int. Cl.
G06F 1/16 (2006.01)
G06F 1/30 (2006.01)

(52) U.S. Cl.
CPC ............ G06F 1/1635 (2013.01); G06F 1/163 (2013.01); G06F 1/305 (2013.01)

(58) Field of Classification Search
CPC ........ G06F 1/305; G06F 1/263; G06F 1/1635; G06F 1/163; H02J 1/084; H02J 1/109; H02M 1/007; H02M 1/008; H02M 1/0067
See application file for complete search history.

(56) References Cited

U.S. PATENT DOCUMENTS

| | | | |
|---|---|---|---|
| 9,991,699 B2 | 6/2018 | Penny et al. | |
| 11,190,098 B2 | 11/2021 | Wang | |

(Continued)

FOREIGN PATENT DOCUMENTS

| | | |
|---|---|---|
| CN | 202033522 U | 11/2011 |
| CN | 206649239 U | 11/2017 |

(Continued)

OTHER PUBLICATIONS

International Search Report dated Feb. 20, 2024, issued in International Patent Application No. PCT /KR2023/018745.

*Primary Examiner* — Fred E Finch, III
*Assistant Examiner* — Nicholas Alden Chapa Mills
(74) *Attorney, Agent, or Firm* — Jefferson IP Law, LLP

(57) ABSTRACT

A wearable device and a power distribution method in a wearable device are provided. The wearable device includes a battery, load circuitry configured to operate by using power supplied from the battery, step-down circuitry connected to a power input terminal of the load circuitry, step-up circuitry connected to a power output terminal of the load circuitry, and a processor configured to obtain a first power loss value while distributing the power from the battery to an electrical component through an operation of the step-down circuitry and the step-up circuitry, obtain a second power loss value during power distribution while distributing the power from the battery to the electrical component, and control the power from the battery to be distributed to the electrical component through the step-up circuitry and the step-down (Continued)

circuitry or control the power from the battery to be distributed to the electrical component.

20 Claims, 15 Drawing Sheets

(56)                References Cited

U.S. PATENT DOCUMENTS

| | | | |
|---|---|---|---|
| 11,513,578 B1 * | 11/2022 | Zhang | H02M 7/483 |
| 2003/0067289 A1 * | 4/2003 | Morita | G09G 3/3611 |
| | | | 323/282 |
| 2008/0278221 A1 | 11/2008 | Rowland | |
| 2018/0019452 A1 | 1/2018 | Suzuki et al. | |
| 2020/0106358 A1 | 4/2020 | Cho et al. | |
| 2021/0036607 A1 | 2/2021 | Choi et al. | |
| 2021/0125542 A1 | 4/2021 | Liu et al. | |
| 2021/0173463 A1 * | 6/2021 | Kim | G06F 1/206 |
| 2023/0105095 A1 * | 4/2023 | Choi | H02M 3/158 |
| | | | 345/211 |

FOREIGN PATENT DOCUMENTS

| | | | |
|---|---|---|---|
| CN | 109932821 A | 6/2019 |
| CN | 209014843 U | 6/2019 |
| CN | 209378315 U | 9/2019 |
| CN | 116520971 A | 8/2023 |
| KR | 10-2013-0031617 A | 3/2013 |
| KR | 10-2018-0112669 A | 10/2018 |
| KR | 10-2019-0101249 A | 8/2019 |
| KR | 10-2019-0116764 A | 10/2019 |
| KR | 10-2201172 B1 | 1/2021 |

* cited by examiner

WEARABLE DEVICE AND POWER DISTRIBUTION METHOD IN WEARABLE DEVICE

CROSS-REFERENCE TO RELATED APPLICATION(S)

This application is a continuation application, claiming priority under § 365(c), of an International application No. PCT/KR2023/018745, filed on Nov. 21, 2023, which is based on and claims the benefit of a Korean patent application number 10-2022-0156182, filed on Nov. 21, 2022, in the Korean Intellectual Property Office, and of a Korean patent application number 10-2022-0159684, filed on Nov. 24, 2022, in the Korean Intellectual Property Office, the disclosure of each of which is incorporated by reference herein in its entirety.

TECHNICAL FIELD

The disclosure relates to a wearable device and a power distribution method in a wearable device. More importantly, the disclosure relates to a wearable device and a power distribution method in a wearable device that enables efficient power distribution in the wearable device having a complex structure and a narrow and long mounting space.

BACKGROUND ART

Various services and additional functions provided through an electronic device, for example, a mobile electronic device, such as a wearable device, have increased. For example, wearable electronic devices may include a glasses-type electronic device and the glasses-type electronic device may provide an augmented reality (AR), virtual reality (VR), mixed reality (MR), or extended reality (XR) service.

Communication service providers or electronic device manufacturers competitively develop an electronic device for providing various functions and differentiation from other businesses to improve utility values of such electronic device and satisfy various desires of users. Therefore, various functions provided through electronic devices have been increasingly advanced.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

An electronic device may use a battery as a power source and when designing a circuit for power distribution inside the electronic device, it may be necessary to consider a length of at least one power distribution line between at least one power source and at least one load powered by the at least one power source, placement locations of at least one power source and at least one load, a difficulty of power delivery from at least one power source to at least one load, efficiency in delivering power from at least one power source to at least one load, and/or heat generated when power is delivered from at least one power source to at least one load.

In case of an electronic device having a simple structure and a wide mounting space, circuit design for power distribution may be relatively easy because it is possible to efficiently arrange power sources, loads, and power distribution lines. However, in case of a wearable device, such as electronic glasses having a complex structure of temples, eyeglass lenses, and a hinge of lenses and temples, and a narrow and long mounting space, circuit design for power distribution may be difficult.

Technical Solution

Aspects of the disclosure are to address at least the above-mentioned problems and/or disadvantages and to provide at least the advantages described below. Accordingly, an aspect of the disclosure is to provide a wearable device and a power distribution method in a wearable device that enables efficient power distribution in the wearable device having a complex structure and a narrow and long mounting space.

Additional aspects will be set forth in part in the description which follows and, in part, will be apparent from the description, or may be learned by practice of the presented embodiments.

In accordance with an aspect of the disclosure, a wearable device is provided. The wearable device includes a battery, a load circuitry including at least one electrical component and configured to operate by using power supplied from the battery, a step-down circuitry connected to a power input terminal of the load circuitry, a step-up circuitry connected to a power output terminal of the load circuitry, and a processor operatively connected to the step-down circuitry and the step-up circuitry. The processor is configured to obtain a first power loss value while distributing power from the battery to the at least one electrical component through an operation of the step-up circuitry and the step-down circuitry, obtain a second power loss value while distributing the power from the battery to the at least one electrical component through a non-operation of the step-up circuitry and the step-down circuitry, based on comparison between the first power loss value and the second power loss value, control the power from the battery to be distributed to the at least one electrical component through the step-up circuitry and the step-down circuitry or control the power from the battery to be distributed to the at least one electrical component without passing through the step-up circuitry and the step-down circuitry.

In accordance with another aspect of the disclosure, a power distribution method in a wearable device is provided. The method includes obtaining a first power loss value while distributing power from the battery to the at least one electrical component through an operation of step-down circuitry connected to a power input terminal of load circuitry operating by using power supplied from a battery and step-up circuitry connected to a power output terminal of the load circuitry, obtaining a second power loss value while distributing power from the battery to the at least one electrical component through a non-operation of the step-up circuitry and the step-down circuitry, based on comparison between the first power loss value and the second power loss value, controlling the power from the battery to be distributed to the at least one electrical component through the step-up circuitry and the step-down circuitry or controlling the power from the battery to be distributed to the at least one electrical component without passing through the step-up circuitry and the step-down circuitry.

In accordance with another aspect of the disclosure, a non-transitory computer-readable recording medium that stores instructions which, when executed by a wearable device, cause the wearable device to perform operations including obtaining a first power loss value while distributing power from the battery to the at least one electrical component through an operation of step-down circuitry connected to a power input terminal of load circuitry operating by using power supplied from a battery and step-up circuitry connected to a power output terminal of the load circuitry, obtaining a second power loss value during power distribution through a non-operation of the step-up circuitry and the step-down circuitry, and controlling the power from the battery to be distributed to the at least one electrical component through the step-up circuitry and the step-down circuitry or controlling the power from the battery to be distributed to the at least one electrical component without passing through the step-up circuitry and the step-down circuitry based on comparison between the first power loss value and the second power loss value.

Advantageous Effects

Another aspect of the disclosure is to provide a wearable device and a power distribution method in a wearable device that enable efficient power distribution in the wearable device having a complex structure and a narrow and long mounting space.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
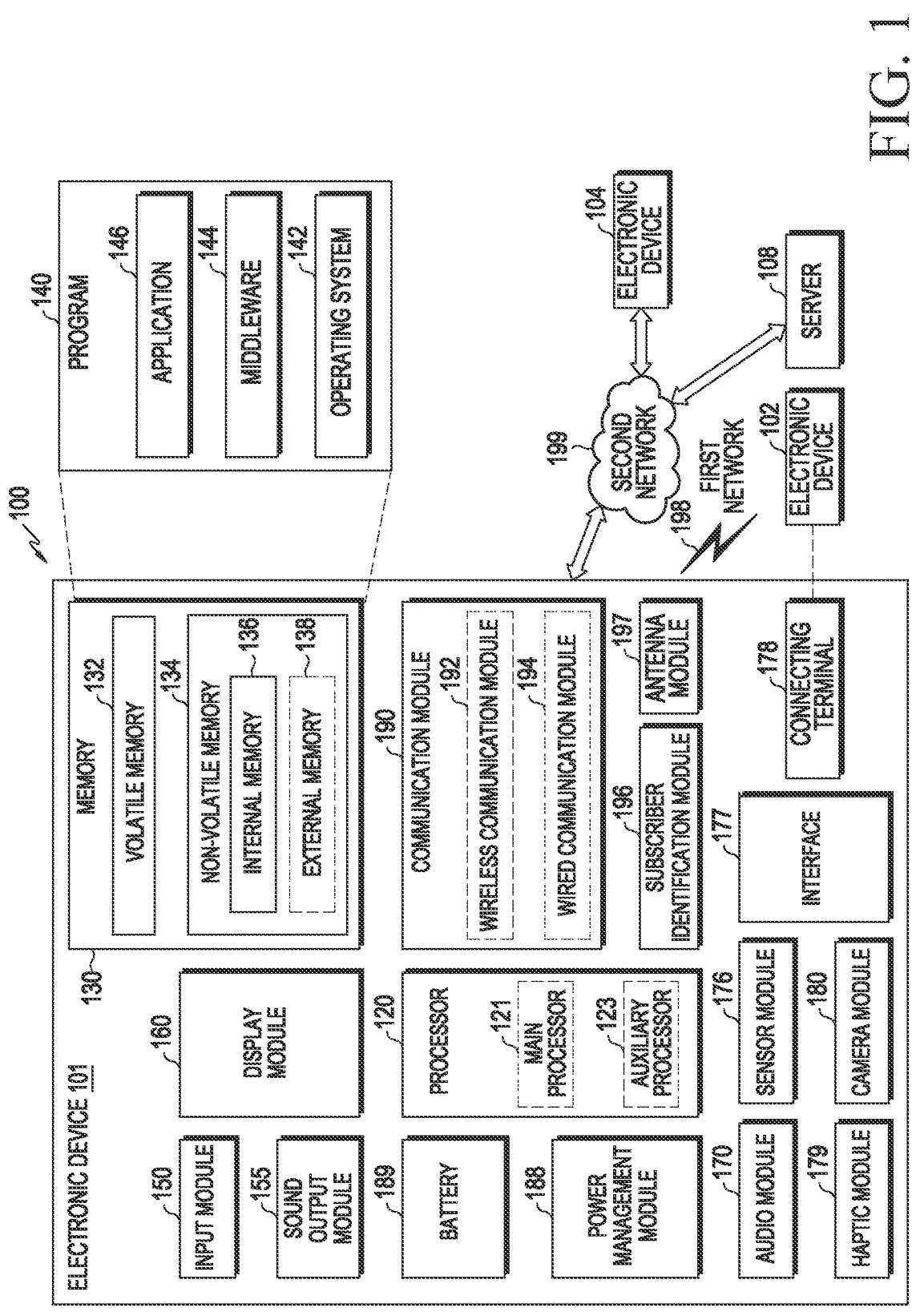
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (wi-fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
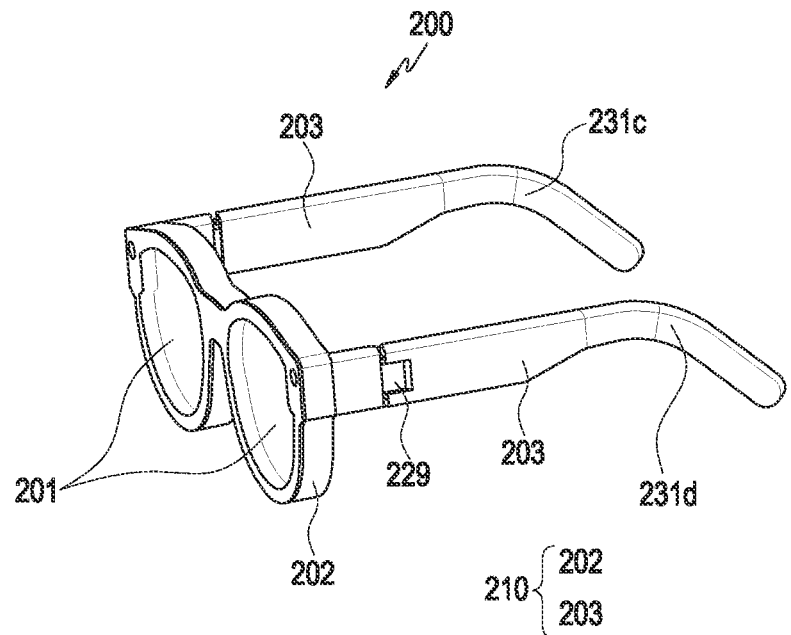
FIG. 2 is a perspective diagram of a wearable device according to an embodiment of the disclosure.

FIG. 2 is a perspective diagram of a wearable device according to an embodiment of the disclosure.

Referring to FIG. 2, a wearable device 200 according to an embodiment is a glasses-type electronic device and a user may recognize a surrounding object or environment while wearing the wearable device 200. For example, the wearable device 200 may include a head mounted device (HMD) or smart glasses which may directly provide an image in front of the user's eye. The configuration of the wearable device 200 of FIG. 2 may be entirely or partially identical to that of the electronic device 101 of FIG. 1.

According to an embodiment of the disclosure, the wearable device 200 may include a housing 210 forming an exterior of the wearable device 200. The housing 210 may provide a space in which components of the wearable device 200 may be arranged. For example, the housing 210 may include a lens frame 202 and at least one wearing member 203.

According to an embodiment of the disclosure, the wearable device 200 may include at least one display member 201 capable of providing visual information to a user. For example, the display member 201 may include a module to which a lens (e.g., a first window member 801 or a second window member 802 in FIG. 8), a display, a waveguide, and/or a touch circuit is mounted. According to an embodiment of the disclosure, the display member 201 may be formed to be transparent or translucent. According to an embodiment of the disclosure, the display member 201 may include translucent glass or a window member of which light transmittivity may be adjusted by adjusting a coloring density thereof. According to an embodiment of the disclosure, a pair of display members 201 may be provided and arranged to correspond to a right eye and a left eye of a user, respectively, while the wearable device 200 is worn on the user's body.

According to another embodiment of the disclosure, the lens frame 202 may receive at least a portion of the at least one display member 201. According to another embodiment of the disclosure, the lens frame 202 may surround at least a portion of an edge of the display member 201. According to an embodiment of the disclosure, the lens frame 202 may position at least one display member 201 to corresponding to the user's eye. According to an embodiment of the disclosure, the lens frame 202 may correspond to a rim of a typical eyeglass structure. According to an embodiment of the disclosure, the lens frame 202 may include at least one closed curved line for surrounding the at least one display member 201.

According to an embodiment of the disclosure, the at least one wearing member 203 may extend from the lens frame 202. For example, the at least one wearing member 203 may extend from an end part of the lens frame 202 and may be supported by or located on the user's body (e.g., the ear) together with the lens frame 202. According to an embodiment of the disclosure, the at least one wearing member 203 may be rotatably coupled to the lens frame 202 through a hinge structure 229. According to an embodiment of the disclosure, the at least one wearing member 203 may include an internal surface 231c configured to face the user's body and an external surface 231d opposite to the internal surface.

According to an embodiment of the disclosure, the wearable device 200 may include the hinge structure 229 configured to allow the at least one wearing member 203 to be foldable with respect to the lens frame 202. The hinge structure 229 may be disposed between the lens frame 202 and the at least one wearing member 203. In a state of not wearing the wearable device 200, the user may fold the at least one wearing member 203 to partially overlap the lens frame 202 to carry or store same.

Figure 3A:
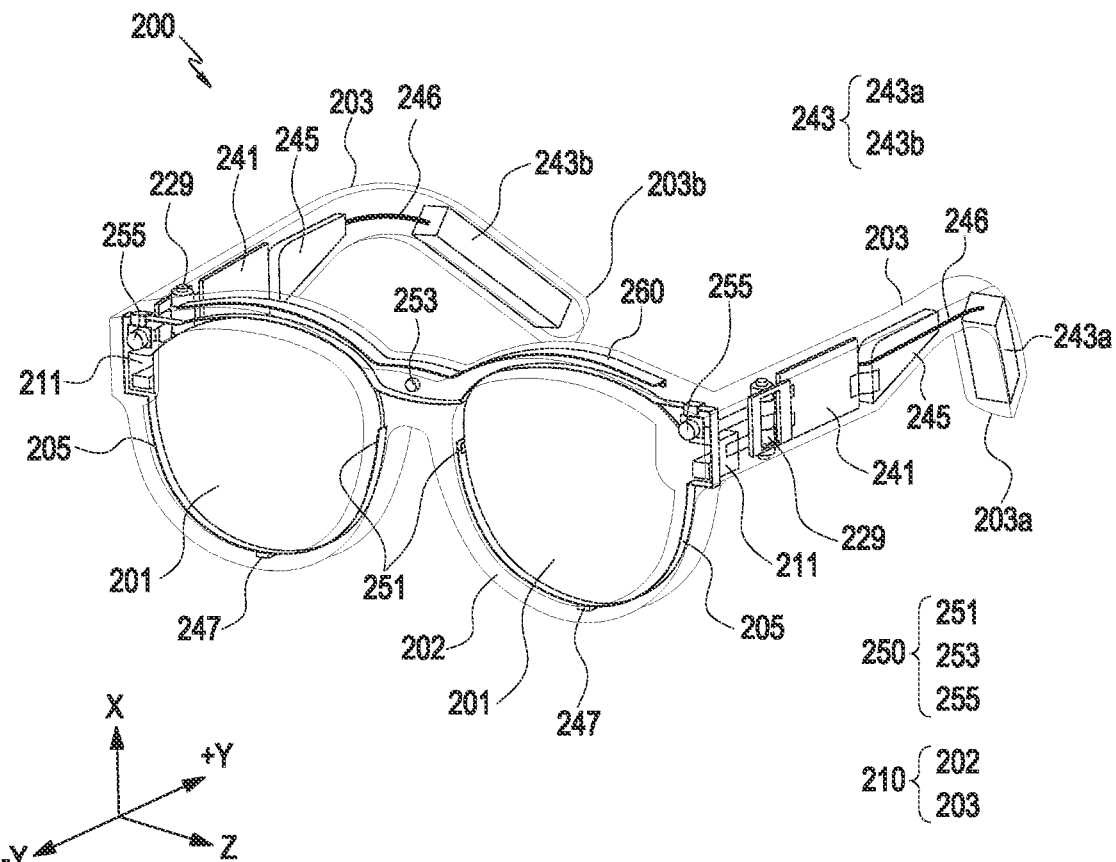
FIG. 3A is a perspective diagram illustrating an internal configuration of a wearable device according to an embodiment of the disclosure.

FIG. 3A is a perspective diagram illustrating an internal configuration of a wearable device according to an embodiment of the disclosure.

Figure 3B:
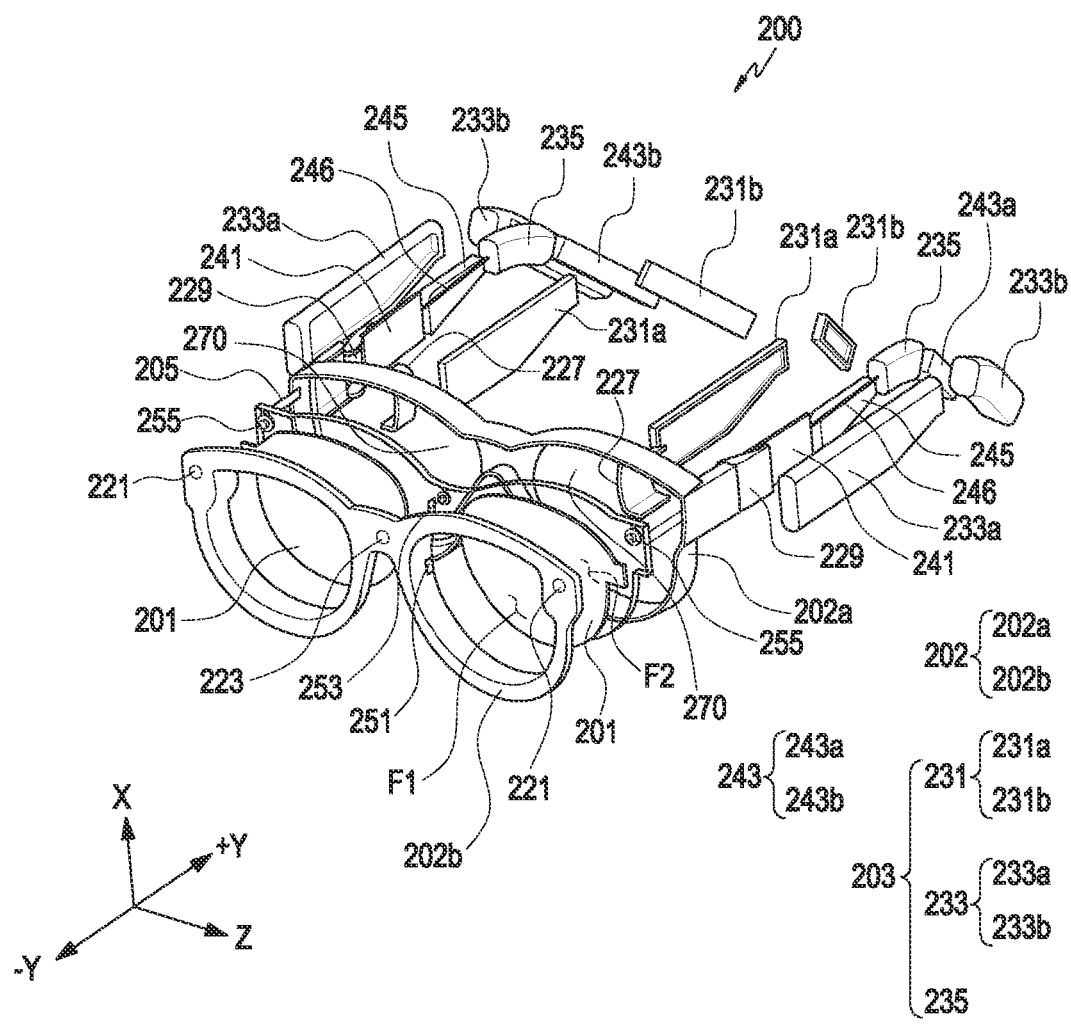
FIG. 3B is an exploded perspective diagram of a wearable device according to an embodiment of the disclosure.

FIG. 3B is an exploded perspective diagram of a wearable device according to an embodiment of the disclosure.

Referring to FIGS. 3A and 3B, the wearable device 200 may include components (e.g., at least one printed circuit board 241 (e.g., a printed circuit board (PCB), a printed board assembly (PBA), a flexible PCB (FPCB), or a rigid-flexible PCB (RFPCB)) received in the housing 210, a battery 243, at least one speaker module 245, at least one power transfer structure 246, and a camera module 250. The configuration of the housing 210 in FIGS. 3A and 3B may be entirely or partially identical to the configuration of the display member 201, the lens frame 202, the at least one wearing member 203, and the hinge structure 229 of FIG. 2.

According to an embodiment of the disclosure, the wearable device 200 may acquire and/or recognize a visual image related to an object or environment in a direction the user views or the wearable device 200 is directed (e.g., the −Y direction) by using the camera module 250 (e.g., the camera 180 in FIG. 1) and may be provided with information on the object or environment from an external electronic device (e.g., the external electronic device 102 or 104 or the server 108 in FIG. 1) through a network (e.g., the first network 198 or the second network 199 in FIG. 1). In another embodiment of the disclosure, the wearable device 200 may provide the provided information on the object or environment to the user in an audio or visual form. The wearable device 200 may provide the provided information on the object or environment to the user in a visual form by using a display module (e.g., the display module 160 in FIG. 1) through the display member 201. For example, as the wearable device 200 realizes the information on the object or environment in a visual form to be combined with a real image of user's surrounding, the wearable device 200 may implement the augmented reality.

According to an embodiment of the disclosure, the display member 201 may include a first surface F1 facing a direction (e.g., the –Y direction) in which light is incident and a second surface F2 facing a direction (e.g., the +Y direction) opposite to the first surface F1. In a state in which the user wears the wearable device 200, light incident through the first surface F1 or a portion of an image may pass through the second surface F2 of the display member 201 disposed to face the right eye and/or the left eye of the user to be incident to the right eye and/or the left eye of the user.

According to an embodiment of the disclosure, the lens frame 202 may include at least one frame. For example, the lens frame 202 may include a first frame 202a and a second frame 202b. According to an embodiment of the disclosure, in case that the user wears the wearable device 200, the first frame 202a may correspond to a frame of a portion facing the face of the user and the second frame 202b may correspond to a portion of the lens frame 202 spaced apart in a direction (e.g., the –Y direction) of the user's gaze with respect to the first frame 202a.

According to an embodiment of the disclosure, at least one light output module 211 may provide an image and/or moving image to the user. For example, the light output module 211 may include a display panel (not shown) for outputting an image and a lens (not shown) corresponding to the user's eye and guiding the image to the display member 201. For example, the user may acquire an image output from the display panel of the light output module 211 through the lens of the light output module 211. According to an embodiment of the disclosure, the light output module 211 may include a device configured to display various information. For example, the light output module 211 may include at least one of a liquid crystal display (LCD) device, a digital mirror device (DMD), a liquid crystal on silicon (LCoS) device, an organic light emitting diode (OLED), or a micro light emitting diode (micro LED). According to an embodiment of the disclosure, in case that the light output module 211 and/or the display member 201 includes one of an LCD, a DMD, or an LCOS, the wearable device 200 may include a light source for emitting light to a display area of the light output module 211 and/or the display member 201. According to an embodiment of the disclosure, in case that the light output module 211 and/or the display member 201 includes one of an OLED or a micro LED, the wearable device 200 may provide a virtual image to the user without including a separate light source.

According to an embodiment of the disclosure, at least a portion of the light output module 211 may be disposed in the housing 210. For example, the light output module 211 may be disposed in the at least one wearing member 203 or the lens frame 202 to corresponding to each of the right eye and the left eye of the user. According to an embodiment of the disclosure, the light output module 211 may be electrically and/or operatively connected to the display member 201 and may provide an image to the user through the display member 201.

According to an embodiment of the disclosure, the at least one printed circuit board 241 may include components for driving the wearable device 200. For example, the printed circuit board 241 may include at least one integrated circuit chip and at least one of the processor 120, the memory 130, the power management module 188, or the communication module 190 of FIG. 1 may be provided to the integrated chip. According to an embodiment of the disclosure, the printed circuit board 241 may be disposed inside the at least one wearing member 203 of the housing 210. According to an embodiment of the disclosure, the printed circuit board 241 may be connected to the battery 243 through the power transfer structure 246. According to an embodiment of the disclosure, the printed circuit board 241 may be connected to a flexible printed circuit board 205 and may transfer an electrical signal to electronic components (e.g., the light output module 211, the camera module 250, and a light-emitting part) of the electronic device through the flexible printed circuit board 205. According to an embodiment of the disclosure, the printed circuit board 241 may correspond to a printed circuit board including an interposer.

According to various embodiments of the disclosure, the at least one flexible printed circuit board 205 may extend from the printed circuit board 241 to an inside of the lens frame 202 via the hinge structure 229 and may be disposed on at least a portion of a circumference of the display member 201 inside the lens frame 202.

According to an embodiment of the disclosure, the battery 243 (e.g., the battery 189 in FIG. 1) may be electrically connected to components (e.g., the light output module 211, the printed circuit board 241, the speaker module 245, a microphone module 247, and the camera module 250) of the wearable device 200 and may provide power to the components of the wearable device 200.

According to an embodiment of the disclosure, at least a portion of the battery 243 may be disposed in the at least one wearing member 203. According to an embodiment of the disclosure, the battery 243 may be disposed at an end portion 203a or 203b of the wearing member 203. For example, the battery 243 may include a first battery 243a disposed at a first end portion 203a of the at least one wearing member 203 and a second battery 243b disposed at a second end portion 203b.

According to an embodiment of the disclosure, the at least one speaker module 245 (e.g., the audio module 170 or the sound output module 155 in FIG. 1) may convert an electrical signal into a sound. At least a portion of the speaker module 245 may be disposed in the at least one wearing member 203 of the housing 210. According to an embodiment of the disclosure, the speaker module 245 may be disposed inside the at least one wearing member 203 to correspond to the user's ear. For example, the speaker module 245 may be disposed between the printed circuit board 241 and the battery 243.

According to an embodiment of the disclosure, the at least one power transfer structure 246 may transfer power of the battery 243 to an electronic component (e.g., the light output module 211) of the wearable device 200. For example, the power transfer structure 246 may be electrically connected to the battery 243 and/or the printed circuit board 241 and the printed circuit board 241 may transfer power received through the power transfer structure 246 to the light output module 211. According to an embodiment of the disclosure, the power transfer structure 246 may be connected to the printed circuit board 241 via the speaker module 245. For example, when viewing the wearable device 200 from the lateral surface (e.g., the Z-axis direction), the power transfer structure 246 may at least partially overlap the speaker module 245.

According to an embodiment of the disclosure, the power transfer structure 246 may include a configuration capable of transferring power. For example, the power transfer structure 246 may include a flexible printed circuit board or a wire. For example, the wire may include multiple cables (not shown). In various embodiments of the disclosure, a form of the power transfer structure 246 may be variously changed according to the number and/or type of cables.

According to an embodiment of the disclosure, the micro-phone module 247 (e.g., the input module 150 and/or the audio module 170 in FIG. 1) may convert a sound into an electrical signal. According to an embodiment of the dis-closure, the microphone module 247 may be disposed on at least a portion of the lens frame 202. For example, the microphone module 247 may be disposed on a lower end (e.g., a direction facing the −X axis) and/or an upper end (e.g., a direction facing the X axis) of the wearable device 200. According to an embodiment of the disclosure, the wearable device 200 may recognize a user's voice more clearly by using voice information (e.g., a sound) acquired by the microphone module 247. For example, the wearable device 200 may distinguish voice information and peripheral noise based on the acquired voice information and/or addi-tional information (e.g., a low-frequency vibration of the user's skin and bones). For example, the wearable device 200 may clearly recognize the user's voice and perform a function (e.g., noise canceling) for reducing peripheral noise.

According to an embodiment of the disclosure, the cam-era module 250 may capture a still image and/or video. The camera module 250 may include at least one of a lens, at least one image sensor, an image signal processor, or a flash. According to an embodiment of the disclosure, the camera module 250 may be disposed in the lens frame 202 and around the display member 201.

According to an embodiment of the disclosure, the cam-era module 250 may include at least one first camera module 251. According to an embodiment of the disclosure, the first camera module 251 may capture the user's eye (e.g., a pupil) or a trajectory of a gaze. For example, the first camera module 251 may capture a reflection pattern of light emitted by the light-emitting part (not shown) to the user's eye. For example, the light-emitting part may emit light in an infrared band for tracking a trajectory of a gaze by using the first camera module 251. For example, the light-emitting part may include an IR LED. According to an embodiment of the disclosure, a processor (e.g., the processor 120 in FIG. 1) may adjust a location of a virtual image so that the virtual image projected to the display member 201 corresponds to a direction in which the user's eye gazes. According to an embodiment of the disclosure, the first camera module 251 may include a global shutter (GS) type camera and the user's eye and a trajectory of a gaze may be tracked by using multiple first camera modules 251 having the same speci-fications and performance.

According to an embodiment of the disclosure, the first camera module 251 may periodically or aperiodically trans-mit information (e.g., trajectory information) on tracking of the user's eye and the trajectory of a gaze to the processor (e.g., the processor 120 in FIG. 1). According to another embodiment of the disclosure, when detecting that the user's gaze is changed (e.g., moving more than a reference value in a state in which the head does not move) based on the trajectory information, the first camera module 251 may transmit the trajectory information to the processor.

According to an embodiment of the disclosure, the cam-era module 250 may include a second camera module 253. According to an embodiment of the disclosure, the second camera module 253 may capture an external image. Accord-ing to an embodiment of the disclosure, the second camera module 253 may include a global shutter type or rolling shutter (RS) type camera. According to an embodiment of the disclosure, the second camera module 253 may capture an external image through a second optical hole 223 formed through the second frame 202b. For example, the second camera module 253 may include a high-resolution color camera and may correspond to a high resolution (HR) or photo video (PV) camera. Furthermore, the second camera module 253 may provide an auto focus (AF) function and an image stabilization function (optical image stabilizer (OIS)).

According to an embodiment of the disclosure, the wear-able device 200 may include a flash (not shown) located adjacent to the second camera module 253. For example, the flash (not shown) may provide light for increasing bright-ness (e.g., illuminance) of a periphery of the wearable device 200 when the second camera module 253 acquires an external image and may reduce image acquisition difficulties due to dark environments, incorporation of various light sources, and/or reflections of light.

According to an embodiment of the disclosure, the cam-era module 250 may include at least one third camera module 255. According to an embodiment of the disclosure, the third camera module 255 may capture a motion of the user through a first optical hole 221 formed through the lens frame 202. For example, the third camera module 255 may capture a user's gesture (e.g., a hand motion). The third camera module 255 and/or the first optical hole 221 may be disposed at opposite lateral ends of the lens frame 202 (e.g., the second frame 202b), for example, at opposite ends of the lens frame 202 (e.g., the second frame 202b) in the Z direction, respectively. According to an embodiment of the disclosure, the third camera module 255 may include a global shutter type camera. For example, the third camera module 255 may correspond to a camera for supporting 3 degrees of freedom (3DoF) or 6DoF and may provide 360-degree space (e.g., omnidirectional) location recogni-tion, and/or movement recognition. According to an embodi-ment of the disclosure, the third camera module 255 may perform a moving path tracking function (simultaneous localization and mapping (SLAM)) and a user's movement recognition function by using multiple global shutter type cameras as stereo cameras having the same specifications and performance. According to an embodiment of the dis-closure, the third camera module 255 may include an infrared (IR) camera (e.g., a time of flight (TOF) camera or structured light camera). For example, the IR camera may operate as at least a portion of a sensor module (e.g., the sensor module 176 in FIG. 1) for detecting a distance to an object.

According to an embodiment of the disclosure, at least one of the first camera module 251 or the third camera module 255 may be replaced with a sensor module (e.g., the sensor module 176 in FIG. 1) (e.g., a Lidar sensor). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment of the disclosure, at least one of the first camera module 251, the second camera module 253, or the third camera module 255 may include multiple camera modules (not shown). For example, the second camera module 253 may include multiple lenses (e.g., wide-angle and telephoto lenses) and image sensors and may be disposed on a surface (e.g., a surface facing the −Y axis) of the wearable device 200. For example, the wearable device 200 may include multiple camera modules having different properties (e.g., an angle of view) or functions and control to change angles of view of camera modules based on a user's selection and/or trajectory information. For example, at least one of the multiple camera modules may be a wide-angle camera and at least another camera may be a telephoto camera.

According to an embodiment of the disclosure, the processor (e.g., the processor 120 in FIG. 1) may determine movement of the wearable device 200 and/or movement of the user based on information of the wearable device 200 acquired by using at least one of a gesture sensor, a gyro sensor, or an acceleration sensor of the sensor module (e.g., the sensor module 176 in FIG. 1) and an operation (e.g., approach of the user to the wearable device 200) of the user acquired by using the first camera module 251. According to an embodiment of the disclosure, in addition to the sensors described above, the wearable device 200 may include a magnetic (geomagnetic) sensor that may measure a direction using a magnetic field and magnetic line of force, and/or a Hall sensor that may acquires movement information (e.g., a movement direction or movement distance) using a strength of a magnetic field. For example, the processor may determine movement of the wearable device 200 and/or movement of the user based on information acquired from a magnetic (geomagnetic) sensor and/or a Hall sensor.

According to an embodiment of the disclosure, the wearable device 200 may perform an input function (e.g., a touch and/or pressure detection function) which allows interaction with the user. For example, a component (e.g., a touch sensor and/or pressure sensor) configured to perform a touch and/or pressure detection function may be disposed on at least a portion of the at least one wearing member 203. The wearable device 200 may control a virtual image output through the display member 201 based on information acquired through the components. For example, a sensor related to the touch and/or pressure detection function may be configured in various types, such as a resistive type, a capacitive type, an electro-magnetic (EM) type, or an optical type. According to an embodiment of the disclosure, the component configured to perform the touch and/or pressure detection function may be entirely or partially identical to the input module 150 in FIG. 1.

According to an embodiment of the disclosure, the wearable device 200 may be disposed in an internal space of the lens frame 202 and may include a reinforcement member 260 formed to have a rigidity higher than that of the lens frame 202.

According to an embodiment of the disclosure, the wearable device 200 may include a lens structure 270. The lens structure 270 may refract at least a portion of light. For example, the lens structure 270 may correspond to a prescription lens having pre-designated refractive power. According to an embodiment of the disclosure, the lens structure 270 may be disposed in a rear side (e.g., the +Y direction) of a second window member (e.g., the second window member 802 in FIG. 8) of the display member 201. According to another embodiment of the disclosure, the lens structure 270 may be disposed between the display member 201 and the user's eye. For example, the lens structure 270 may face a surface of the display member.

According to an embodiment of the disclosure, the housing 210 may include a hinge cover 227 for covering a portion of the hinge structure 229. Another portion of the hinge structure 229 may be received or covered between an internal case 231 and an external case 233 to be described below.

According to an embodiment of the disclosure, the at least one wearing member 203 may include an internal case 231 and an external case 233. The internal case 231 may correspond to a case configured to, for example, face the user's body or directly contact the user's body and may be manufactured of a material having a low heat conductivity, for example, a synthetic resin. According to an embodiment of the disclosure, the internal case 231 may include an internal surface (e.g., the internal surface 231c in FIG. 2) facing the user's body. The external case 233 may include, for example, a material (e.g., a metallic material) capable of at least partially transferring heat and may be coupled to face the internal case 231. According to an embodiment of the disclosure, the external case 233 may include an external surface (e.g., the external surface 231d in FIG. 2) opposite to the internal surface 231c. In an embodiment of the disclosure, at least one of the printed circuit board 241 or the speaker module 245 may be received in a space separated from the battery 243 inside the at least one wearing member 203. In the described embodiment of the disclosure, the internal case 231 may include a first case 231c including the printed circuit board 241 or the speaker module 245 and a second case 231b for receiving the battery 243, and the external case 233 may include a third case 233a coupled to face the first case 231a and a fourth case 233d coupled to face the second case 231b. For example, the first case 231a and the third case 233a may be coupled (hereinafter, a "first case part 231a and 233a") to receive the printed circuit board 241 and/or the speaker module 245, and the second case 231b and the fourth case 233b may be coupled (hereinafter, a "second case part 231b and 233b") to receive the battery 243.

According to various embodiments of the disclosure, the first case part 231a and 233a may be rotatably coupled to the lens frame 202 through the hinge structure 229, and the second case part 231b and 233b may be connected or mounted to an end portion of the first case part 231a and 233a through a connection member 235. In some embodiments of the disclosure, a portion of the connection member 235, which comes in contact with the user's body, may be manufactured of a material having a low heat conductivity, for example, an elastic material, such as silicone or polyurethane, and a portion not in contact with the user's body may be manufactured of a material (e.g., a metallic material) having a high conductivity. For example, in case that heat is generated from the printed circuit board 241 or the battery 243, the connection member 235 may block the heat from being transferred to the portion coming in contact with the user's body and disperse or dissipate the heat through the portion not in contact with the user's body. According to an embodiment of the disclosure, the portion of the connection member 235, which is configured to come in contact with the user's body, may be interpreted as a portion of the internal case 231, and the portion of the connection member 235, which is not in contact with the user's body may be interpreted as a portion of the external case 233. According to an embodiment (not shown), the first case 231a and the second case 231b may be integrally formed without the connection member 235, and the third case 233a and the fourth case 233b may be integrally formed without the connection member 235.

According to an embodiment of the disclosure, other components (e.g., the antenna module 197 in FIG. 1) may be further included in addition to the aforementioned components, and information on the object or environment may be provided from an external electronic device (e.g., the external electronic device 102 of 104 or the server 108 in FIG. 1)

through the network (e.g., the first network 198 or the second network 199 in FIG. 1) by using the communication module 190.

According to an embodiment of the disclosure, the wearable device 200 may include the battery 243 and load circuitry receiving power from the battery 243. According to an embodiment of the disclosure, the load circuitry may include at least one electrical component. the wearable device 200 may have a different power efficiency and/or heating state according to the types of the at least one electrical component included the load circuitry receiving power from the battery 243, the distance of each of the electrical components supplied with power from the battery 243, and/or the length of a power distribution line between the battery and load circuits or between load circuits. For example, in case that a physical distance between the battery 243 and the load circuit is long, such as the case that the battery 243 is located at a temple of glasses and the load circuit is located at a lens of the glasses and a structure is complex due to a structure like a hinge, it may be difficult to efficiently transfer power from the battery 243 to the load circuit. A thick FPCB may be used for a hinge area, a connector with multiple pins may be applied to an area connecting an FPCB and a general PCB, and a wiring may be designed thick for the front and leg areas of the glasses to increase power efficiency.

However, the scheme may result in a significant increase in cost and weight. For example, an FPCB is expensive, and thus it is advantageous to minimize the use thereof, and in case that a lead wire is designed to be thick to handle a large current, the hinge operation performance is poor, and in case that the lead wire is designed to be wide, the hinge may need to be made wider. In addition, the design of a connector for connecting the FPCB and the general PCB requires a technology in higher level to minimize resistance components or an increase in the number of pins, thereby causing price and space constraints. In addition to the FPCB, in case of copper which is used for power distribution line and has 14 mΩ per 1 cm length based on a wire width of 1 mm and a thickness of 12 um, and if a distance from the battery 243 to the load circuit is 10 cm and a current is 4 A, a power loss of 2.4 W occurs only in the power distribution line, which may cause problems with heat generation and usage time.

Figure 4A:
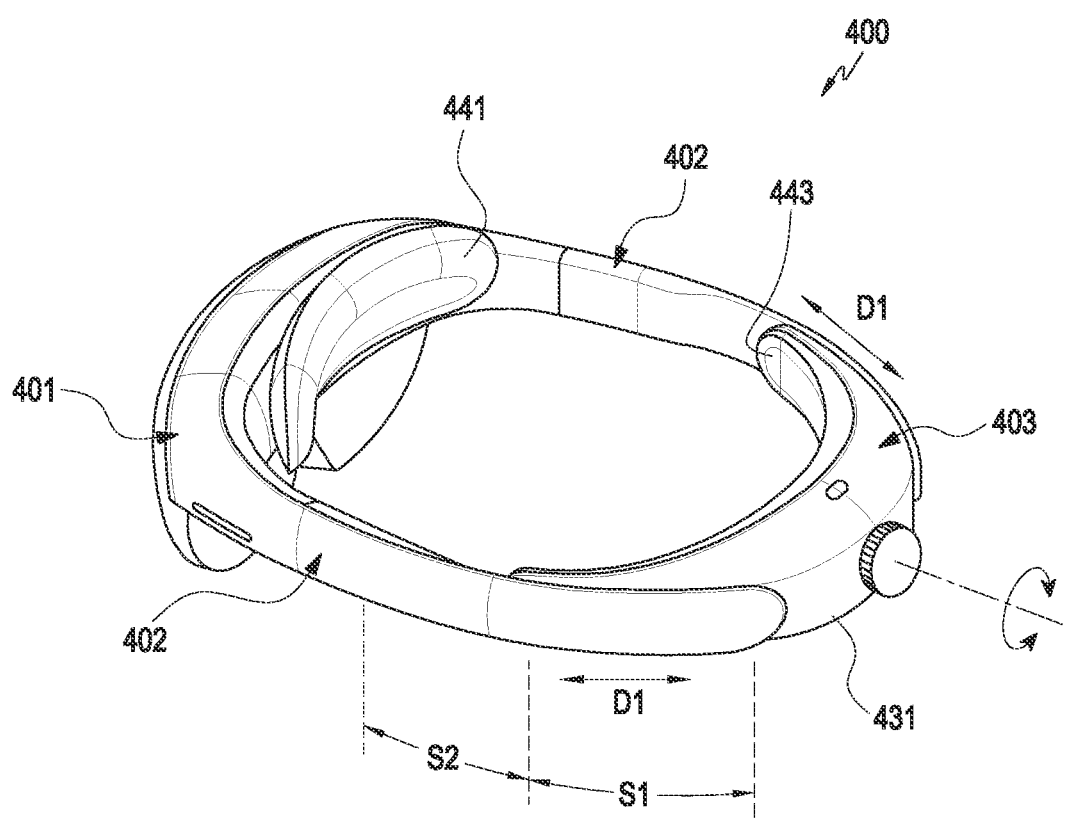
FIG. 4A is a perspective diagram illustrating a wearable device according to an embodiment of the disclosure.

FIG. 4A is a perspective diagram illustrating a wearable electronic device according to an embodiment of the disclosure.

Referring to FIG. 4A, a wearable electronic device 400 according to an embodiment may include a display part 401, a wearing frame 402, and/or an adjustment part 403 and may further include at least one cushion member 441 or 443 disposed on a portion in directly contact with the user body. A pair of wearing frames 402 are provided and may each extend from the display part 401. The adjustment part 403 may be coupled to the wearing frames 402 to be slidable by a designated distance (e.g., D1) and the coupling may allow the wearable electronic device 400 to have a closed curved line shape. For example, the display part 401, the wearing frames 402, and/or the adjustment part 403 may be arranged or coupled to each other to form a closed curved line. By sliding the adjustment part 403 with respect to the wearing frames 402, the user may adjust a wearing state of the wearable electronic device 400. For example, as sliding the adjustment part 403 with respect to the wearing frames 402, the closed curve line shape may be extended or reduced and the user may adjust close contact or supported state between the wearable electronic device 400 and the user's body (e.g., the head).

According to an embodiment of the disclosure, the display part 401 may substantially block a real image of the surrounding environment and may provide the user with visual information (e.g., an image or video implementing a virtual space) output through a projector or flat display panel. For example, the wearable electronic device 400 may implement virtual reality to be provided to the user. In another embodiment of the disclosure, the display part 401 may include a camera module (not shown) and may photograph the surrounding environment in a direction that the user is looking at and provide same to the user through a projector or a flat display panel. In some embodiments of the disclosure, the wearable electronic device 400 may extract information on an image or video captured in real time from data stored in the wearable electronic device or collected through a network environment (e.g., the first network 198 and/or the second network 199 in FIG. 1) and combine the captured image and video with the extracted information and provide same to the user. For example, the wearable electronic device 400 may implement augmented reality to be provided to the user. In still another embodiment of the disclosure, the display part 401 may project a real image of the surrounding environment and provide same to the user and may visually provide information on an image or video captured through the camera module (e.g., the camera module 180 in FIG. 1) to the user.

According to an embodiment of the disclosure, the pair of wearing frames 402 may each extend from the display part 401 and may be located at lateral sides of the user's head to face each other in a state of being worn on the user's body. In some embodiments of the disclosure, the wearing frames 402 may be at least partially integrally manufactured with the display unit 401. According to an embodiment of the disclosure, the wearing frames 402 may include a first segment S1 in sliding contact with the adjustment part 403 and a second segment S2 for connecting the first segment S1 and the display part 401. According to an embodiment of the disclosure, as the adjustment part 403 slides with respect to the wearing frames 402 and/or the wearing frames 402 slide with respect to the adjustment part 403 in a first direction D1, a contact area between the adjustment part 403 and the first segment S1 may be increased or reduced. According to an embodiment of the disclosure, the adjustment part 403 may be substantially in contact with or supported by the rear side of the user's body (e.g., the head) and may be slidably coupled to the wearing frames 402.

According to an embodiment of the disclosure, the wearable electronic device 400 may include various electrical components, such as a camera module (e.g., the camera module 180 in FIG. 1), a projector or flat display panel, sensors, a printed circuit board, and/or a battery. The electrical components may be distributively arranged in the display part 401, the wearing frames 402, and/or the adjustment part 403 and electrically connected to each other through a wiring (e.g., the wiring 463 in FIG. 4B). According to an embodiment of the disclosure, the wearing frames 402 may at least partially receive the wiring (e.g., the wiring 463 in FIG. 4B). For example, as the various electrical components are properly distributed and arranged at least in the display part 401 and the adjustment part 403, the distributively arranged electrical components may be electrically connected to each other through a concealed wiring and the concealed wiring may improve the exterior appearance of the wearable electronic device 400.

Figure 4B:
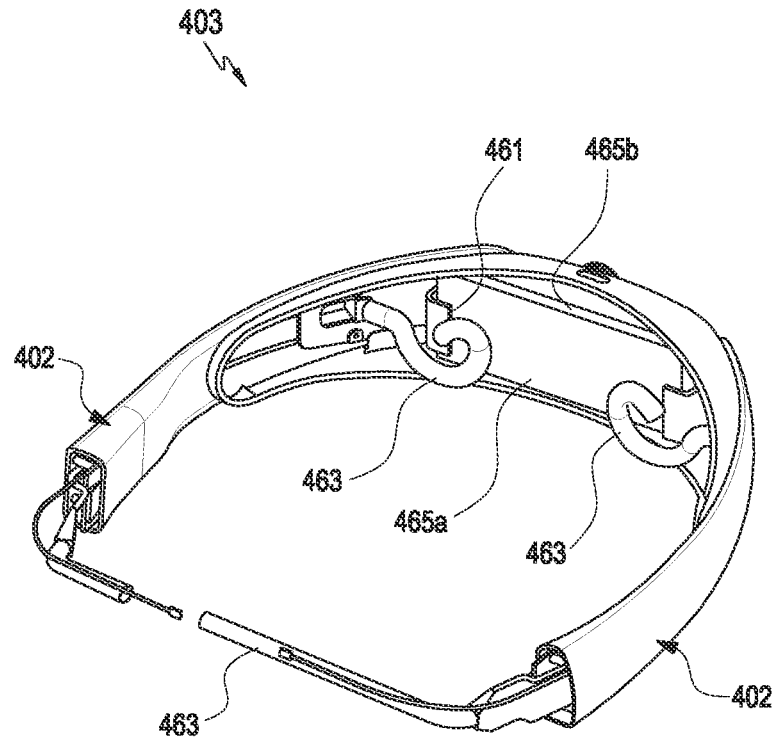
FIG. 4B is a perspective diagram illustrating a figure in which an electrical component (components) is disposed on an adjustment part of a wearable electronic device according to an embodiment of the disclosure.

FIG. 4B is a perspective diagram illustrating a figure in which an electrical component (or components) is disposed on an adjustment part 403 of a wearable electronic device 400 according to an embodiment of the disclosure.

Referring to FIG. 4B, the wearable electronic device 400 according to an embodiment may provide a passage connected from an internal space of the adjustment part 403 to the display part 401 via internal spaces of the wearing frame(s) 402. A wiring passage from the adjustment part 403 according to an embodiment to the display part 401 may be formed through at least one hole (not shown), and the wiring 463 (e.g., a cable or a flexible printed circuit board) may not be visually exposed to the outside and at least partially disposed in the internal space of the wearing frame(s) 402. According to an embodiment of the disclosure, the wiring 463 may be disposed from the internal space of the adjustment part 403 to the internal space of the display part 401 via the internal space of the wearing frame 402. For example, the wiring 463 may electrically connect electrical components (e.g., a printed circuit board 465a and/or a battery 465b) in the adjustment part 403 and electrical components (e.g., a projector, a flat display panel, and/or a camera module) in the display part 401.

According to an embodiment of the disclosure, the adjustment part 403 may include at least one support structure 461, and the support structure 461 may mount or fix electrical components (e.g., the printed circuit board 465a and/or the battery 465b) in the internal space of the adjustment part 403 and prevent the electrical components from interfering with other mechanical structures.

According to an embodiment of the disclosure, as the wiring 463, for example, a cable or flexible printed circuit board is not visually exposed to the outside, for example, received in the display part 401, the wearing frames 402, and/or the adjustment part 403, the exterior of the wearable electronic device 400 may be improved. Even if various electrical components, such as a projector, a flat panel display panel, a camera module, various sensors, a circuit board and/or a battery is distributively arranged in proper locations of the wearable electronic device 400, the wiring 463 (e.g., a cable or flexible printed circuit board) may be used for easily connecting the electrical components. For example, an input module or an output module, such as a projector or a camera module may be disposed in the display part 401 and electrical components, such as the printed circuit board 465a and/or the battery 4 may be disposed in the adjustment part 403. As the electrical components are distributively arranged in the display part 401 or the adjustment part 403, the power efficiency and/or heating state may be changed according to the types of components (e.g., load circuits) receiving power from the battery 465b, the distance of each of the components supplied with power from the battery 465b, and/or the length of a power distribution line between the battery and load circuits or between load circuits. For example, in case that a physical distance between the battery 465b and the load circuit is long, such as the case that the battery 465b is located in the adjustment part 403 and the load circuit is located in the display part 201 and a structure is complex due to a structure like the wearing frame 402, it may be difficult to efficiently transfer power from the battery 465b to the load circuit. In FIGS. 2, 3A, 3B, 4A and 4B, a wearable electronic device 200 or 400 is shown and described, but is not limited thereto, and a portion of the configuration of the wearable electronic device 200 or 400 shown in FIGS. 2, 3A, 3B, 4A and FIG. 4B may be included in an electronic device, such as a smart-phone or a tablet PC.

According to an embodiment of the disclosure, the wearable electronic device 200 or 400 may enhance the power transfer efficiency by using a step-up circuit and a step-down circuit on a power transfer path for power transfer.

Figure 5:
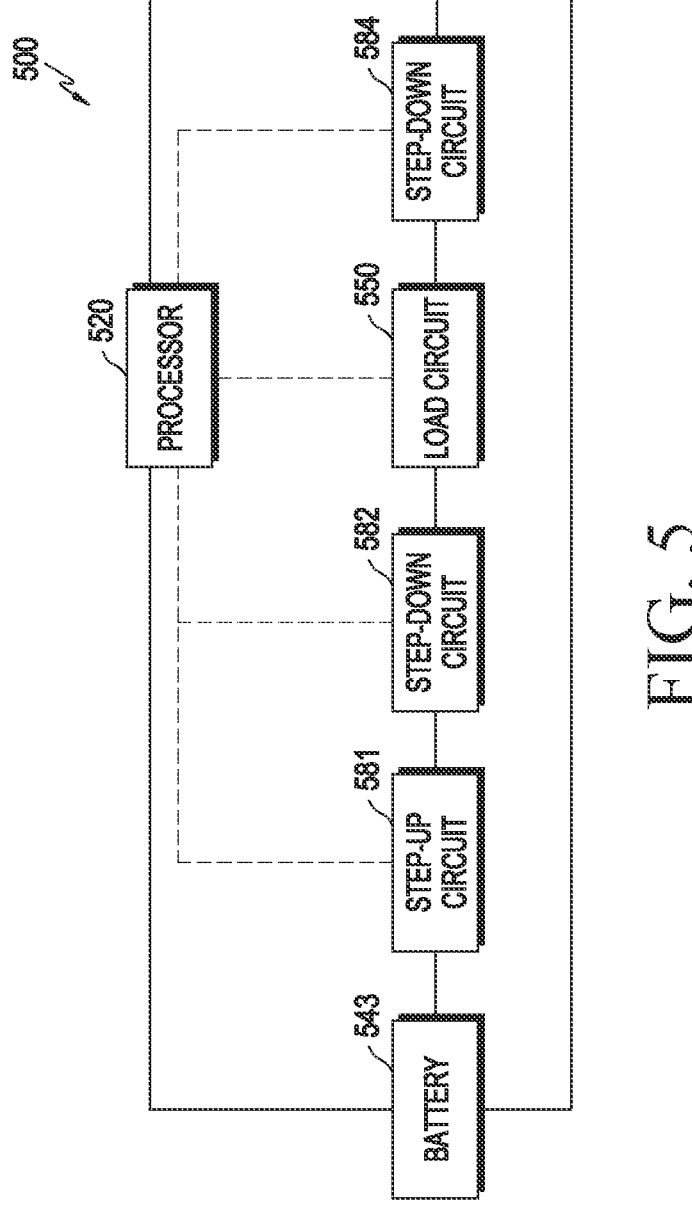
FIG. 5 is a block diagram of a wearable device according to an embodiment of the disclosure.

FIG. 5 is a block diagram of a wearable electronic device according to an embodiment of the disclosure.

Referring to FIG. 5, a wearable electronic device 500 (e.g., the wearable device 200 in FIG. 2 or the wearable electronic device 400 in FIG. 4A) according to an embodiment may include a processor 520, a battery 543, a step-up circuit 581, a step-down circuit 582, a load circuit 550, a step-up circuit 584. Although one load circuit 550 is shown in FIG. 5, more load circuits may be further included, and an example including the step-up circuits 581 and 582 and the step-down circuit 582 is shown, but additional step-up circuits or step-down circuits may be further included.

The battery 543 (e.g., the battery 189 in FIG. 1, the battery 243 in FIGS. 3A and 3B, or the battery 465b in FIG. 4B) according to an embodiment may be electrically connected to the load circuit 550 including at least one electrical component (e.g., the light output module 211, the circuit board 241, the speaker module 245, the microphone module 247, the camera module 250, the power transfer structure 246 (e.g., a flexible printed circuit board or a wire), or a connector (e.g., a bonding part between an electric wire and a flexible printed circuit board or a wire)) of the wearable device 500 and may supply power to the load circuit 550.

The step-up circuit 581 according to an embodiment may be connected to a power output terminal of the battery 581 and may increase a voltage of power output from the battery 581 and reduce a current. For example, the step-up circuit 581 may include a switched capacitor converter or a boost converter.

The step-down circuit 582 according to an embodiment may be connected to a power input terminal of the load circuit 550 and may reduce a voltage of power input to the load circuit 550 and increase a current. For example, the step-down circuit 582 may include a switched capacitor converter or a buck converter.

The step-up circuit 584 according to an embodiment may be connected to a power output terminal of the load circuit 550 and may increase a voltage of power output from the load circuit 550 and reduce a current. For example, the step-up circuit 584 may include a switched capacitor converter or a boost converter.

The processor 520 according to an embodiment may control overall operations of the wearable device 500 and control a power distribution operation. The processor 520 according to an embodiment may acquire first power loss information during power distribution through an operation of the step-up circuits 581 and 584 and the step-down circuit 582. The processor 520 according to an embodiment may obtain the first power loss value while distributing power from the battery 543 to the at least one electrical component of the load circuit 550 through an operation of the step-down circuit 582 and the step-up circuit 581 and 584. For example, the processor 520 may control the step-up circuit 581 to increase a voltage of power output from the battery 543 and reduce a current, control the step-down circuit 582 to reduce a voltage of power input to the load circuit 550 and increase a current, control the step-up circuit 584 to increase a voltage of power output from the load circuit 550 and reduce a current, and identify a first power loss value when power is supplied from the battery 543 to each component of the wearable device 500. The processor 520 according to an embodiment may acquire second power loss information during power distribution through non-operation of the step-up circuits 581, the step-down circuit 582, and the step-up circuit 584. The processor 520 according to an embodiment may obtain the second power loss value while distributing the power from the battery 543 to the at least one electrical component of load circuit 550 through non-operation of the step-up circuits 581, the step-down circuit 582, and the step-up circuit 584. For example, the processor 520 may identify the second power loss value when power is supplied from the battery 543 to each component of the wearable device 500 in a state in which a voltage input to the load circuit 550 does not pass through the step-up circuit 581 and the step-down circuit 582 and a voltage output from the load circuit 550 does not pass through the step-up circuit 584. The processor 520 according to an embodiment may identify whether the step-up circuits 581 and 584 and the step-down circuit 582 are operated based on comparison of the first power loss information and the second power loss information. For example, in case that the first power loss value is smaller than the second power loss value by comparing the first power loss value and the second power loss value, the processor 520 may control the step-up circuit 581 to increase a voltage of power output from the battery 542 and reduce a current, control the step-down circuit 582 to reduce a voltage of power input to the load circuit 550 and increase a current, and control the step-up circuit 584 to increase a voltage of power output from the load circuit 550 and reduce a current so as to perform power distribution. For example, in case that the first power loss value is not smaller than the second power loss value, the processor 520 may control the power (or current) input to the load circuit 550 not to pass through the step-up circuit 581 and the step-down circuit 582 and the power (or current) output from the load circuit 550 not to pass through the step-up circuit 584 so as to perform power distribution.

The load circuit 550 is exemplified in the description of FIG. 5, but the wearable device 500 according to an embodiment may further include at least one other load circuit include at least one other electrical component, and the at least one other load circuit may include one from among the light output module 211, the circuit board 241, the speaker module 245, the microphone module 247, the camera module 250, the power transfer structure 246 (e.g., a flexible printed circuit board or a wire), or a connector (e.g., a bonding part between an electric wire and a flexible printed circuit board or a wire, or a power transfer electric wire having a length longer than a designated length). In case of further including at least one other load circuit according to an embodiment of the disclosure, an additional step-down circuit may be disposed at a power input terminal of each of the added at least one load circuit and a step-up circuit may be disposed at a power output terminal of the added at least one load circuit.

A wearable device (e.g., the electronic device 101 in FIG. 1, the wearable device 200 in FIG. 2, or the wearable device 500 in FIG. 5) may include a battery (e.g., the battery 189 in FIG. 1, the battery 243 in FIGS. 3A and 3B), or the battery 543 in FIG. 5), load circuitry (e.g., the load circuit 550 in FIG. 5) including at least one electrical component and configured to operate by using power supplied from the battery, step-down circuitry (e.g., the step-down circuit 582 in FIG. 5) connected to a power input terminal of the load circuitry, step-up circuitry (e.g., the step-up circuit 584 in FIG. 5) connected to a power output terminal of the load circuit, and a processor (e.g., the processor 120 in FIG. 1 or the processor 520 in FIG. 5) operatively connected to the step-down circuitry and the step-up circuitry. The processor according to an embodiment may obtain a first power loss value while distributing power from the battery to the at least one electrical component through an operation of the step-up circuitry and the step-down circuitry. The processor according to an embodiment may obtain a second power loss value while distributing the power from the battery to the at least one electrical component through a non-operation of the step-up circuitry and the step-down circuitry. The processor according to an embodiment may be configured to control the power from the battery to be distributed to the at least one electrical component through the step-up circuitry and the step-down circuitry, based on comparison between the first power loss value and the second power loss value, or control the power from the battery to be distributed to the at least one electrical component without passing through the step-up circuitry and the step-down circuitry.

The processor according to an embodiment may be configured to control the power from the battery to be distributed the at least one electrical component through the step-up circuitry and the step-down circuitry in case that the first power loss value is smaller than the second power loss value and control the power from the battery to be distributed the at least one electrical component without passing through the step-up circuitry and the step-down circuitry in case that the first power loss value is not smaller than the second power loss value.

The at least one electrical component according to an embodiment may include a light output module, a circuit board, a speaker module, a microphone module, or a camera module.

A first connector, a flexible printed circuit board (FPCB), and a second connector according to an embodiment may be included.

The step-down circuitry according to an embodiment may include a switched capacitor converter or a buck converter.

The step-up circuitry according to an embodiment may include a switched capacitor converter or a boost converter.

The processor according to an embodiment may be configured to, based on a first power loss curve according to a current while distributing the power from the battery to the at least one electrical component through an operation of the step-down circuitry and the step-up circuitry and a second power loss curve according to a current while distributing the power from the battery to the at least one electrical component through an operation of the step-down circuitry and the step-up circuitry, operate the step-down circuitry and the step-up circuitry at a current greater than or equal to a designated current value based on a designated current value at a point where the first power loss curve and the second power loss curve intersect and not operate the step-down circuitry and the step-up circuitry at a current less than the designated current value.

The wearable device according to an embodiment may further include a memory (e.g., the memory 130 in FIG. 1), and the memory may store a first power loss value and a second power loss value.

The wearable device according to an embodiment may further include a step-up circuitry (e.g., the step-up circuit 581 in FIG. 5) connected to an output terminal of the battery.

Figure 6:
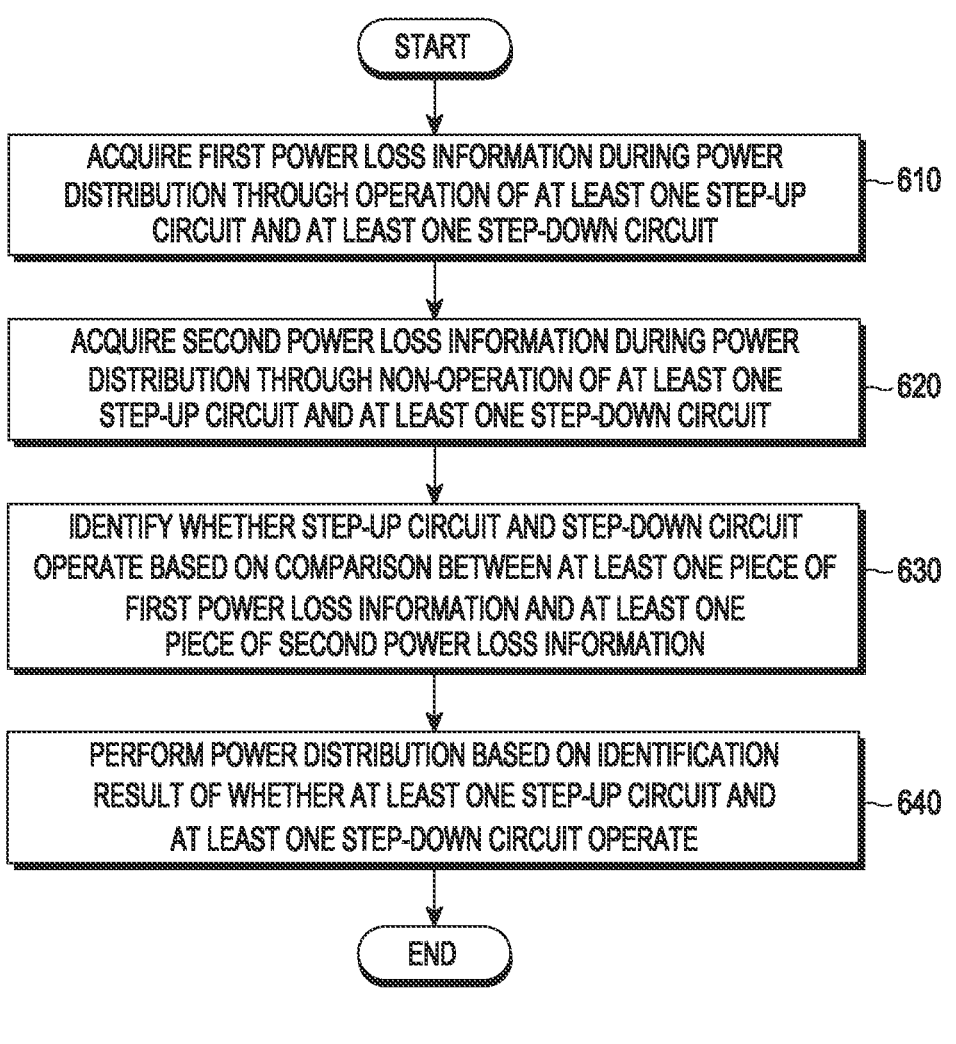
FIG. 6 is a flowchart illustrating a power distribution operation in a wearable device according to an embodiment of the disclosure.

FIG. 6 is a flowchart illustrating a power distribution operation in a wearable device according to an embodiment of the disclosure.

Referring to FIG. 6, the processor 520 (e.g., the processor 120 in FIG. 1 or the processor 520 in FIG. 5) of the wearable device 500 (e.g., the electronic device 101 in FIG. 1, the wearable device 200 in FIG. 2, or the wearable electronic device 400 in FIG. 4A) according to an embodiment may perform at least one of operation 610 to operation 640.

In operation 610, the processor 520 according to an embodiment may acquire first power loss information (or value) during power distribution through an operation of at least one step-up circuits (e.g., the step-up circuit 581 and the step-up circuit 584) and at least one step-down circuit (e.g., the step-down circuit 582). For example, the processor 520 may control the step-up circuit 581 to increase a voltage of power output from the battery 543 and reduce a current, control the step-down circuit 582 to reduce a voltage of power input to the load circuit 550 and increase a current, control the step-up circuit 584 to increase a voltage of power output from the load circuit 550 and reduce a current, and identify a first power loss value when power is supplied from the battery 543 to each component of the wearable device 500.

In operation 620, the processor 520 according to an embodiment may acquire second power loss information (or value) during power distribution through a non-operation of at least one step-up circuits (e.g., the step-up circuit 581 and the step-up circuit 584) and at least one step-down circuit (e.g., the step-down circuit 582). For example, the processor 520 may identify the second power loss value when power is supplied from the battery 543 to each component of the wearable device 500 in a state of not passing through the step-up circuit 581, the step-down circuit 582, and the step-up circuit 584. For example, the first power loss value and the second power loss value may be respectively identified when the power of the electronic device 500 is turned on or respectively identified in real time (or periodically) after the power of the electronic device 500 is turned on. For example, the first power loss value and the second power loss value may be identified when a predetermined module (e.g., a camera module) is operated.

In operation 630, the processor 520 according to an embodiment may identify whether at least one step-up circuit (e.g., the step-up circuit 581 and the step-up circuit 584) and at least one step-down circuit (e.g., the step-down circuit 582) operate, based on comparison between the first power loss information and the second power loss information. For example, the processor 520 may compare the first power loss value and the second power loss value and identify that the step-up circuit 581, the step-down circuit 582, and the step-up circuit 584 should be operating when the first power loss value is smaller than the second power loss value. For example, the processor 520 may compare the first power loss value and the second power loss value and identify that the step-up circuit 581, the step-down circuit 582, and the step-up circuit 584 should not be operating when the first power loss value is not smaller than the second power loss value. According to an embodiment of the disclosure, although not shown in FIG. 6, in case that a designated module (e.g., a camera module (not shown)) in the electronic device 500 operates, the step-up circuit 581, the step-down circuit 582, and the step-up circuit 584 may be configured to operate without comparison between the first power loss information and the second power loss information.

In operation 640, the processor 520 according to an embodiment may perform power distribution control based on the identification of whether at least one step-up circuit (e.g., the step-up circuit 581 and the step-up circuit 584) and at least one step-down circuit (e.g., the step-down circuit 582) operate. For example, in case that the first power loss value is smaller than the second power loss value, the processor 520 may control the step-up circuit 581 to increase a voltage of power output from the battery 542 and reduce a current, control the step-down circuit 582 to reduce a voltage of power input to the load circuit 550 and increase a current, and control the step-up circuit 584 to increase a voltage of power output from the load circuit 550 and reduce a current while the power from the battery 543 is distributed to the at least one electrical component. For example, in case that the first power loss value is not smaller than the second power loss value, the processor 520 may control the voltage input to the load circuit 550 not to pass through the step-up circuit 581 and the step-down circuit 582 and the voltage output from the load circuit 550 not to pass through the step-up circuit 584 while the power from the battery 543 is distributed to the at least one electrical component.

Figure 7:
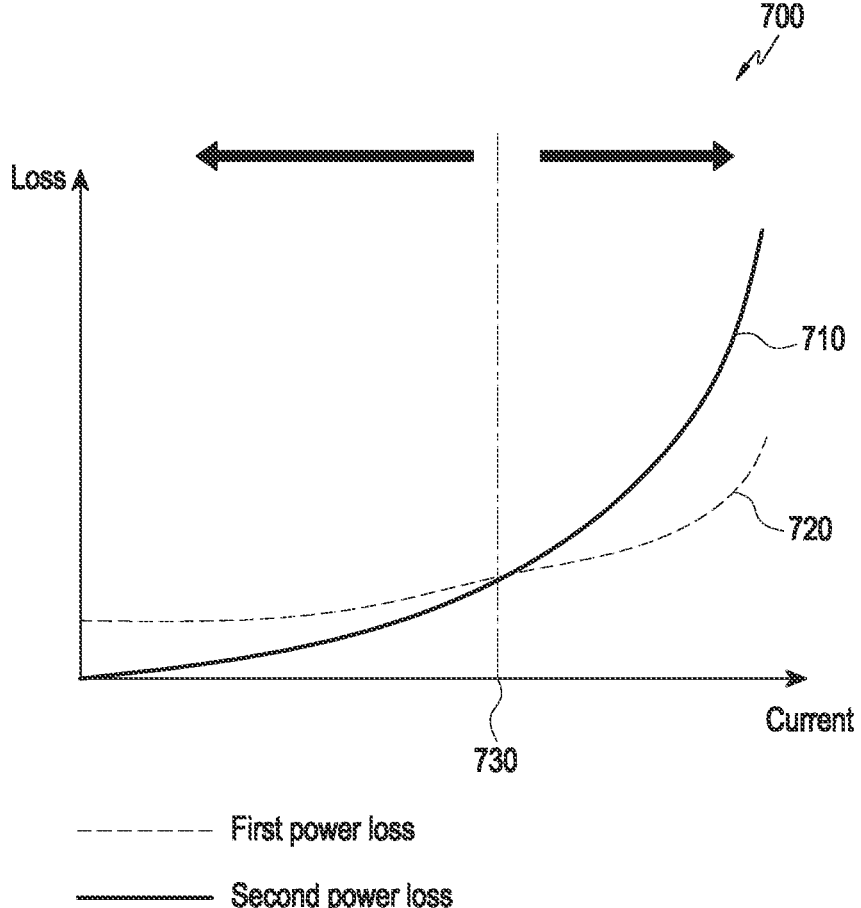
FIG. 7 is a graph depicting a first power loss curve and a second power loss curve according to an embodiment of the disclosure.

FIG. 7 is a graph 700 depicting a first power loss curve and a second power loss curve according to an embodiment of the disclosure.

Referring to FIG. 7, the processor 520 (e.g., the processor 120 in FIG. 1 or the processor 520 in FIG. 5) of the wearable device 500 (e.g., the electronic device 101 in FIG. 1, the wearable device 200 in FIG. 2, or the wearable electronic device 400 in FIG. 4A) according to an embodiment may identify whether at least one step-up circuit (e.g., the step-up circuit 581 and the step-up circuit 584) and at least one step-down circuit (e.g., the step-down circuit 582) operate, by using the first power loss information and the second power loss information stored in advance according to a current. For example, the processor 520 may control the step-up circuit 581 to increase a voltage of power output from the battery 543 and reduce a current, control the step-down circuit 582 to reduce a voltage of power input to the load circuit 550 and increase a current, control the step-up circuit 584 to increase a voltage of power output from the load circuit 550 and reduce a current, and store a first power loss curve 710 with respect to the first power loss value according to a provision current when power is supplied from the battery 543 to each component of the wearable device 500. For example, the processor 520 may store a second power loss curve 720 with respect to the second power loss value according to a current when power is supplied from the battery 543 to each component of the wearable device 500 in a state of not passing through the step-up circuit 581, the step-down circuit 582, and the step-up circuit 584 (e.g., a bypass state).

The processor 520 according to an embodiment may identify whether at least one step-up circuit (e.g., the step-up circuit 581 and the step-up circuit 584) and at least one step-down circuit (e.g., the step-down circuit 582) operate by using the first power loss curve 710 according to a current during power distribution through an operation of at least one step-up circuits (e.g., the step-up circuit 581 and the step-up circuit 584) and at least one step-down circuit (e.g., the step-down circuit 582) and the second power loss curve 720 according to a current during power distribution through a non-operation of at least one step-up circuits (e.g., the step-up circuit 581 and the step-up circuit 584) and at least one step-down circuit (e.g., the step-down circuit 582). For example, the processor 520 may operate at least one step-up circuits (e.g., the step-up circuit 581 and the step-up circuit 584) and at least one step-down circuit (e.g., the step-down circuit 582) at a current greater than or equal to a designated current value 730 based on the designated current value 730 at a point where the first power loss curve 710 and the second power loss curve 720 intersect and not operate or bypass at least one step-up circuits (e.g., the step-up circuit 581 and the step-up circuit 584) and at least one step-down circuit (e.g., the step-down circuit 582) at a current less than the designated current value 730.

A power distribution method in a wearable device (e.g., the electronic device 101 in FIG. 1, the wearable electronic device 200 in FIG. 2, the wearable electronic device 400 in FIG. 4A, or the wearable electronic device 500 in FIG. 5) may include an operation of obtaining a first power loss value while distributing power from the battery to at least one electrical component through an operation of step-down circuitry (e.g., the step-down circuit 582 in FIG. 5) connected to a power input terminal of load circuitry (e.g., the load circuit 530 in FIG. 5) including the at least one electrical component operating by using power supplied from a battery (e.g., the battery 189 in FIG. 1, the battery 243 in FIGS. 3A and 3B, or the battery 543 in FIG. 5) and step-up circuitry (e.g., the step-up circuit 584 in FIG. 5) connected to a power output terminal of the load circuitry. The method according to an embodiment may include an operation of obtaining a second power loss value while distributing the power from the battery to at least one electrical component through a non-operation of the step-up circuitry and the step-down circuitry. The method according to an embodiment may include, based on comparison between the first power loss value and the second power loss value, an operation of controlling the power from the battery to be distributed to the at least one electrical component through the step-up circuitry and the step-down circuitry or controlling the power from the battery to be distributed to the at least one electrical component without passing through the step-up circuitry and the step-down circuitry.

The method according to an embodiment may include an operation of controlling the power from the battery to be distributed to the at least one electrical component in case that the first power loss value is smaller than the second power loss value. The method according to an embodiment may include an operation of controlling the power from the battery to be distributed to the at least one electrical component in case that the first power loss value is not smaller than the second power loss value.

In the method according to an embodiment of the disclosure, the at least one electrical component may include a light output module, a circuit board, a speaker module, a microphone module, or a camera module.

In the method according to an embodiment of the disclosure, the load circuit may include a first connector, a flexible printed circuit board (FPCB), and a second connector.

In the method according to an embodiment of the disclosure, the step-down circuitry may include a switched capacitor converter or a buck converter.

In the method according to an embodiment of the disclosure, the step-up circuitry may include a switched capacitor converter or a boost converter.

The method according to an embodiment of the disclosure may include, based on a first power loss curve according to a current while distributing power from the battery to the at least one electrical component through an operation of the step-down circuitry and the step-up circuitry and a second power loss curve according to a current while distributing power from the battery to the at least one electrical component through an operation of the step-down circuitry and the step-up circuitry, an operation of operating the step-down circuitry and the step-up circuitry at a current greater than or equal to a designated current value based on a designated current value at a point where the first power loss curve and the second power loss curve intersect and an operation of not operating the step-down circuitry and the step-up circuitry at a current less than the designated current value.

The method according to an embodiment of the disclosure may include an operation of storing, in a memory, the first power loss value and the second power loss value.

In the method according to an embodiment of the disclosure, the wearable device may further include step-up circuitry (e.g., the step-up circuit 581 in FIG. 5) connected to an output terminal of the battery.

Figure 8:
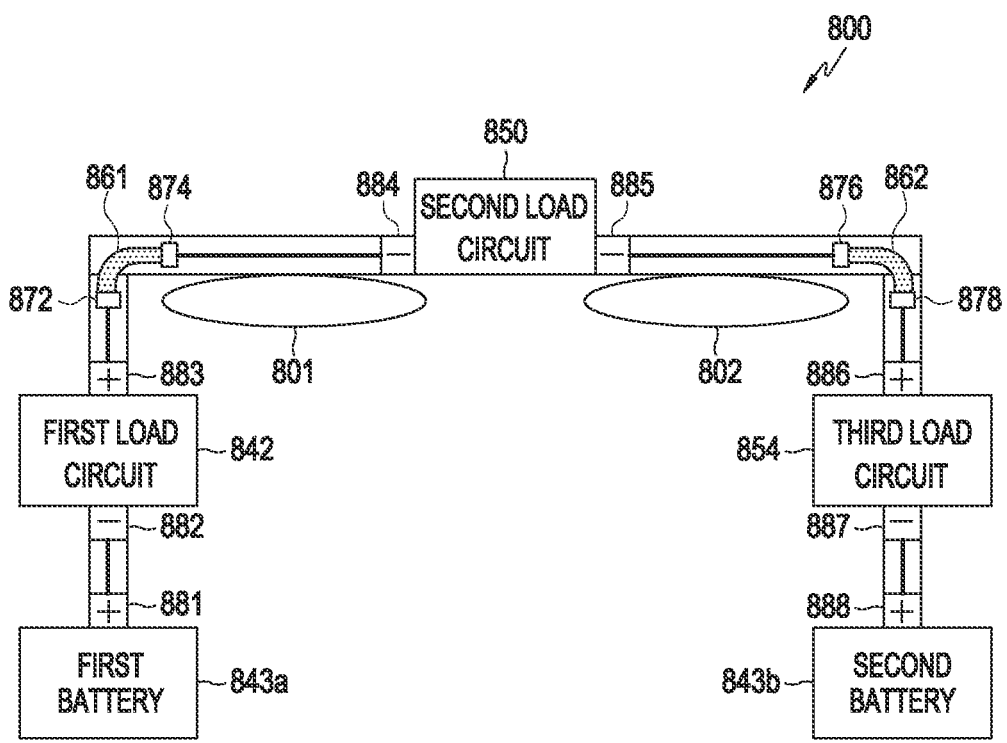
FIG. 8 is a diagram illustrating a power distribution circuit structure of a wearable device according to an embodiment of the disclosure.

FIG. 8 is a diagram illustrating a power distribution circuit structure of a wearable device according to an embodiment of the disclosure.

Referring to FIG. 8, a wearable device 800 (e.g., the electronic device 101 in FIG. 1, the wearable device 200, in FIG. 2, or the wearable device 500 in FIG. 5) according to an embodiment may be correspond to a glasses-type electronic device (e.g., also referred to as "electronic glasses") including a first window member 801 and a second window member 802 (e.g., the at least one display member 201 in FIG. 1 or the display part 401 in FIG. 4A).

The electronic glasses (i.e., the wearable device 800) according to an embodiment may include a first battery 843*a*, a second battery 843*b*, a first step-up circuit 881, a first step-down circuit 882, a first load circuit 842, a second step-up circuit 883, a first connector 872, a first flexible printed circuit board (or wire) 861, a second connector 874, a second step-down circuit 884, a second load circuit 850, a third step-down circuit 885, a third connector 876, a second flexible printed circuit board (or wire) 862, a fourth connector 878, a third step-up circuit 886, a third load circuit 854, a fourth step-down circuit 887, a fourth step-up circuit 888, and a second battery 843*b*. Each of the first load circuit 842, the second load circuit 850, and the third load circuit 854 of the electronic glasses (i.e., the wearable device 800) according to an embodiment may correspond to one of at least one circuit board 241 (e.g., a printed circuit board (PCB), a printed board assembly (PBA), a flexible PCB (FPCB), or a rigid-flexible PCB (RFPCB)), a processor (not shown), at least one speaker module 245, the camera module 250, or a display module 160. Alternatively, each of the first load circuit 842, the second load circuit 850, and the third load circuit 854 may correspond to another electronic module (or component).

The first battery 843*a* (e.g., the first battery 243*a* in FIG. 3B) and the second battery 843*b* (e.g., the second battery 243*b* in FIG. 3B) of the electronic glasses (i.e., the wearable device 800) (e.g., the wearable electronic device 200 in FIG. 2 or the wearable electronic device 400 in FIG. 4A) according to an embodiment of the disclosure may be arranged at an end portion of temples of the glasses and may supply power (or electric power).

According to an embodiment of the disclosure, an input terminal of the first step-up circuit 881 may be connected to an output terminal of the first battery 843*a*, and the first step-up circuit 881 may reduce a current and increase a voltage of power output from the first battery 843*a*.

According to an embodiment of the disclosure, an input terminal of the first step-down circuit 882 may be connected to an output terminal of the first step-up circuit 881 through a power distribution line, and an output terminal of the first step-down circuit 882 may be connected to an output terminal of the first load circuit 842. The first step-down circuit 882 may increase a current and reduce a voltage of power boosted and transferred by the first step-up circuit 881.

According to an embodiment of the disclosure, the first load circuit 842 may operate by receiving power supplied from the output terminal of the first step-down circuit 882, and an output terminal of the first load circuit 842 may be connected to an input terminal of the second step-up circuit 883.

According to an embodiment of the disclosure, the second step-up circuit 883 may reduce a current and increase a voltage of power output by the output terminal of the first load circuit 842 to be output. According to an embodiment of the disclosure, an output terminal of the second step-up circuit 883 may be connected to the first connector 872 through a power distribution line, the first connector 872 may be connected to the first flexible printed circuit board (or wire) 861, and the first flexible printed circuit board (or wire) 861 may be connected to the second connector 874. For example, as the power is boosted by the second step-up circuit 883, a loss of power passing through the first connector 872, the first flexible printed circuit board (or wire) 861, and the second connector 874 may be compensated. According to an embodiment of the disclosure, an output terminal of the second connector 874 may be connected to an input terminal of the second step-down circuit 884.

According to an embodiment of the disclosure, the second step-down circuit 884 may increase a current and reduce a voltage of power transferred from the second connector 874 to be output. An output terminal of the second step-down circuit 884 may be connected to an input terminal of the second load circuit 850.

According to an embodiment of the disclosure, an input terminal of the fourth step-up circuit 888 may be connected to an output terminal of the second battery 843*b*, and the fourth step-up circuit 888 may reduce a current and increase a voltage of power output from the first battery 843*b*.

According to an embodiment of the disclosure, an output terminal of the fourth step-up circuit 888 may be connected to an input terminal of the fourth step-down circuit 887 through a power distribution line, and an output terminal of the fourth step-down circuit 887 may be connected to an input terminal of the third load circuit 854. The fourth step-down circuit 887 may increase a current and reduce a voltage of power boosted and transferred by the fourth step-up circuit 888.

According to an embodiment of the disclosure, the third load circuit 854 may operate by receiving power supplied from the output terminal of the fourth step-down circuit 887, and an output terminal of the third load circuit 854 may be connected to an input terminal of the third step-up circuit 886.

According to an embodiment of the disclosure, the third step-up circuit 886 may reduce a current and increase a voltage of power output by the output terminal of the third load circuit 854 to be output. According to an embodiment of the disclosure, an output terminal of the third step-up circuit 886 may be connected to the fourth connector 878 through a power distribution line, the fourth connector 878 may be connected to the second flexible printed circuit board (or wire) 862, and the second flexible printed circuit board (or wire) 862 may be connected to the third connector 876. For example, as the power is boosted by the second step-up circuit 886, a loss of power passing through the fourth connector 878, the second flexible printed circuit board (or wire) 862, and the third connector 876 may be compensated. According to an embodiment of the disclosure, an output terminal of the third connector 876 may be connected to an input terminal of the third step-down circuit 885.

According to an embodiment of the disclosure, the third step-down circuit 885 may increase a current and reduce a voltage of power transferred from the third connector 876 to be output. An output terminal of the third step-down circuit 885 may be connected to an input terminal of the second load circuit 850.

According to an embodiment of the disclosure, the second load circuit 850 may be connected to an output terminal of the second step-down circuit 884 and an output terminal of the third step-down circuit 885, and may operate by using power supplied from the second step-down circuit 884 and/or the third step-down circuit 885.

According to the power distribution circuit structure of the wearable device 800 shown in FIG. 8, by arranging the step-up circuit (e.g., the first step-up circuit 881, the second step-up circuit 883, the third step-up circuit 886, or the fourth step-up circuit 888) and the step-down circuit (e.g., the first step-down circuit 882, the second step-down circuit 884, the third step-down circuit 885, or the fourth step-down circuit 887) at the connector (e.g., the first connector 872, the second connector 874, the third connector 876, or the fourth connector 878) at both ends of the power distribution line or the flexible printed circuit board (e.g., the first flexible printed circuit board (or wire) 861 or the second flexible printed circuit board (or wire) 862) between the load circuits (e.g., the first load circuit 842, the second load circuit 850, and the third load circuit 854), power transmission efficiency may be increased even if the resistance is high due to a power distribution line or a flexible printed circuit board longer than a designated length.

Figure 9:
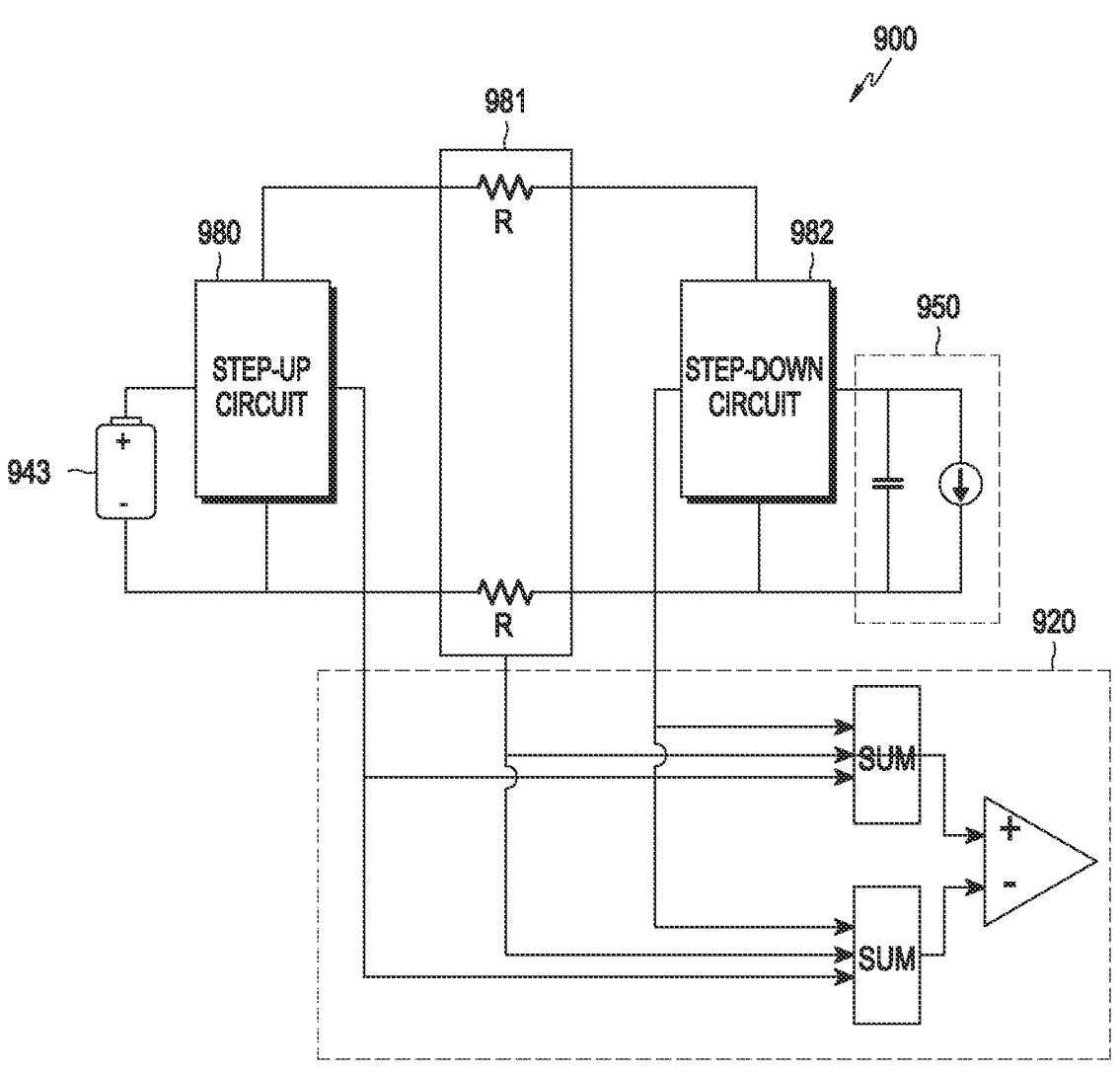
FIG. 9 is a diagram illustrating a control circuit configured to control a step-up circuit and a step-down circuit of a wearable device according to an embodiment of the disclosure.

FIG. 9 is a diagram illustrating a control circuit configured to control a step-up circuit and a step-down circuit of a wearable device according to an embodiment of the disclosure.

Referring to FIG. 9, a wearable device 900 according to an embodiment may include a portion or the entirety of the components of the electronic device 101 in FIG. 1, the wearable device 200 in FIG. 2, the wearable electronic device 400 in FIG. 4A, the wearable device 500 in FIG. 5, or the wearable control device 800 in FIG. 8.

The wearable device 900 according to an embodiment may include a battery 943 (e.g., the battery 543 in FIG. 5), a step-up circuit 980 (e.g., the step-up circuit 584 in FIG. 5), a resistor 981 (e.g., an internal resistor of a power distribution line), a load circuit 950 (e.g., the load circuit 550 in FIG. 5), a step-down circuit 982 (e.g., the step-down circuit 582 in FIG. 5), a control circuit 920 (e.g., the processor 120 in FIG. 1 or the processor 520 in FIG. 5).

According to an embodiment of the disclosure, the control circuit 920 may identify whether the step-down circuit 982 and the step-up circuit 980 operate and control a power distribution operation. For example, a portion or the entirety of an operation of the control circuit 920 may be performed.

The battery 943 (e.g., the battery 189 in FIG. 1, the battery 243 in FIG. 2, or the battery 365*b* in FIG. 4B) according to an embodiment may be electrically connected to the load circuit 950 (e.g., the light output module 211, the circuit board 241, the speaker module 245, the microphone module 247, the camera module 250, the power transfer structure 246 (e.g., a flexible printed circuit board or a wire), or a connector (e.g., a bonding part between an electric wire and a flexible printed circuit board or a wire)) through the step-up circuit 980, the resistor 981, and the step-down circuit 982 and may supply power.

According to an embodiment of the disclosure, the step-up circuit 980 may be connected to a power output terminal of the battery 943, an output terminal of the step-up circuit 980 may be connected to the resistor 981, and the resistor 981 may be connected to an input terminal of the step-down circuit 982. The step-up circuit 980 of an input terminal of the resistor 981 may compensate conduction loss of the resistor 981. The step-down circuit 982 may increase a current and reduce a voltage at the output terminal of the resistor 981 to allow power having an appropriate voltage and current to be transferred to the load circuit 950.

According to an embodiment of the disclosure, the control circuit 920 may be respectively connected the step-up circuit 980, the resistor 981, and the step-down circuit 982.

According to an embodiment of the disclosure, the control circuit 920 may measure power loss of the step-up circuit 980 by using a difference (e.g., Pin-Pout, Pin=Vin*Iin, Pout=Vout*Iout) between input power and output power of the step-up circuit 980. For example, the control circuit 920 may measure power loss of the step-down circuit 982 by using a difference between input power and output power of the step-down circuit 982. For example, the control circuit 920 may measure power loss of the power distribution line, based on an output terminal voltage of the step-up circuit 980, an input terminal voltage of the step-down circuit 982, and a current passing through the resistor 981. According to an embodiment of the disclosure, the control circuit 920 may pre-store loss caused by a current (or voltage) passing through each of the step-up circuit 980, the resistor 981, and the step-down circuit 982, or estimate power loss caused by a current (or voltage) passing through each of the step-up circuit 980, the resistor 981, and the step-down circuit 982 by using a predetermined equation (e.g., Ploss=Fsw*Psw+ Pcond, wherein Fsw: Switching frequency, Psw: loss caused when performing switching, Pcond: loss caused by current conduction and determined by resistance*current$^2$) which may be used for estimating each loss of the step-up circuit 980, the resistor 981, and the step-down circuit 982.

According to an embodiment of the disclosure, in case that a current from power from the battery 943 conducts the step-up circuit 980, the resistor 981, and the step-down circuit 982, the control circuit 920 may identify (or confirm or acquire) a first power loss value based on power loss at each of the step-up circuit 980, the resistor 981, and the step-down circuit 982. According to an embodiment of the disclosure, in case that a current from power from the battery 943 only conducts the resistor 981 without passing through the step-up circuit 980 and the step-down circuit 982 to be transferred to the load circuit 950, the control circuit 920 may identify (or confirm or acquire) a second power loss value based on power loss at the resistor 981.

According to an embodiment of the disclosure, the control circuit 920 may identify whether the step-up circuit 980 and the step-down circuit 982 operate, based on comparison of the first power loss value and the second power loss value. For example, the control circuit 920 may compare the first power loss value and the second power loss value and control the step-up circuit 980 and the step-down circuit 982 to operate when the first power loss value is smaller than the second power loss value. For example, the processor 520 may compare the first power loss value and the second power loss value and control the step-up circuit 980 and the step-down circuit 982 not to operate when the first power loss value is not smaller than the second power loss value.

Figure 10:
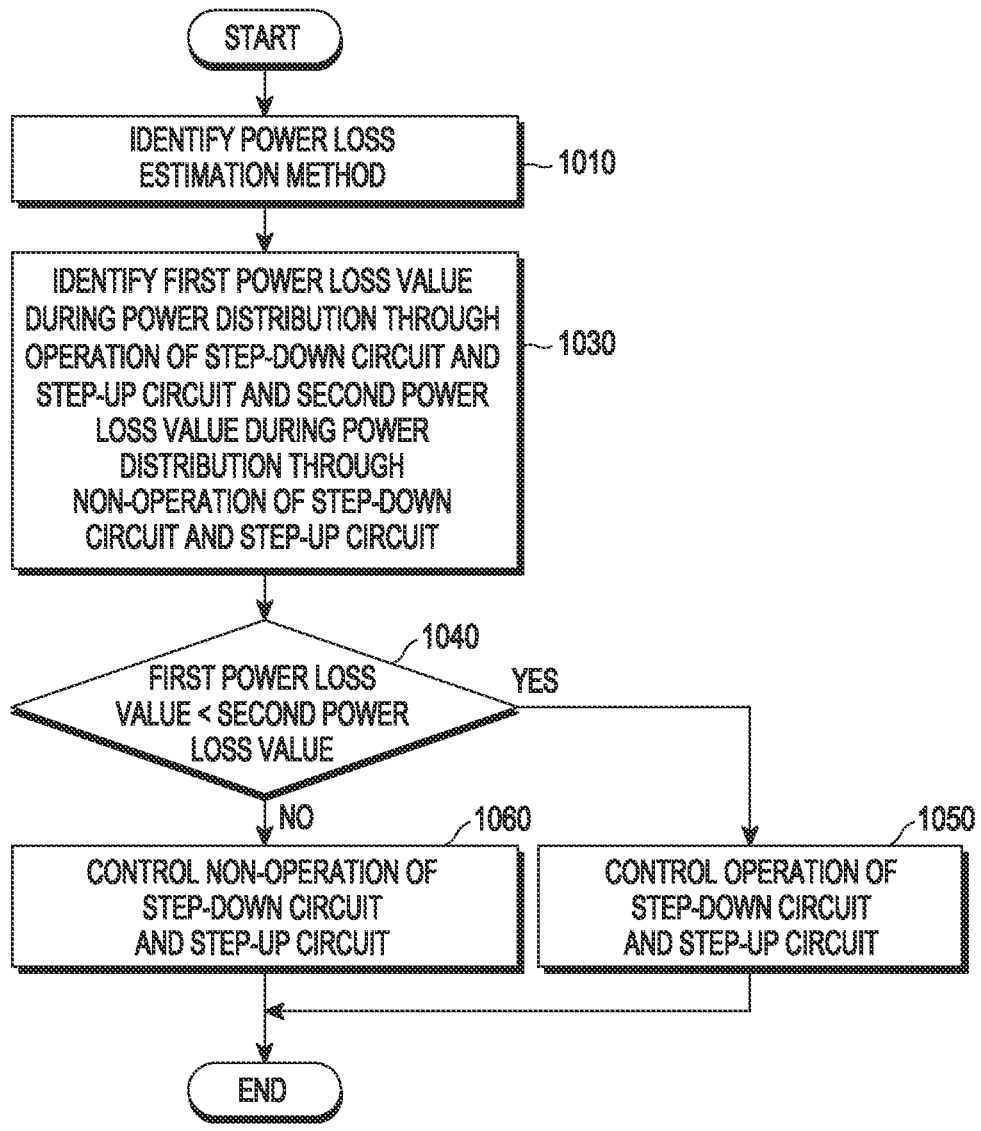
FIG. 10 is a flowchart illustrating an operation of a control circuit in a wearable device according to an embodiment of the disclosure.

FIG. 10 is a flowchart illustrating an operation of a control circuit in a wearable device according to an embodiment of the disclosure.

Referring to FIG. 10, the control circuit 920 (e.g., the processor 120 in FIG. 1 or the processor 520 in FIG. 5) of the wearable device 900 (e.g., the electronic device 101 in FIG. 1, the wearable device 200 in FIG. 2, the wearable electronic device 400 in FIG. 4A, or the wearable device 500 in FIG. 5) according to an embodiment may perform at least one of operation 1010 to operation 1060.

In operation 1010, the control circuit 920 according to an embodiment of the disclosure may identify a power loss estimation method. According to an embodiment of the disclosure, the control circuit 920 may identify one of a power loss estimation method among a lookup table use method, a loss equation use method, a loss curve information use method according to a current, or a sensing method. According to an embodiment of the disclosure, in case that the lookup table use method is used, the wearable device 900 may further include a memory (e.g., the memory 130 in FIG. 1), and the control circuit 920 may refer a lookup table including a first power loss value during power distribution through an operation of the step-up circuit and the step-down circuit and a second power loss value during power distribution through a non-operation of the step-up circuit and the step-down circuit, which are stored in the memory. According to an embodiment of the disclosure, in case that the loss equation use method is used, the control circuit 920 may estimate power loss caused by a current (or voltage) passing through each of the step-up circuit 980, the resistor 981, and the step-down circuit 982 by using a predetermined equation (e.g., Ploss=Fsw*Psw+Pcond, wherein Fsw: Switching frequency, Psw: loss caused when performing switching, Pcond: loss caused by current conduction and determined by resistance*current) which may be used for estimating each loss of the step-up circuit 980, the resistor 981, and the step-down circuit 982. According to an embodiment of the disclosure, in case that the loss curve information (e.g., a loss calculation function) according to a current is used, the control circuit 920 may estimate power loss according to a first power loss curve during power distribution through an operation of the step-up circuit 980 and the step-down circuit 982 and a second power loss curve during power distribution through a non-operation of the step-up circuit 980 and the step-down circuit 982. Hereinafter, in operations after 1020, an example of using the sensing method as the power loss estimation method will be described.

In operation 1030, the control circuit 920 according to an embodiment may identify a first power loss value during power distribution through an operation of the step-up circuit 980 and the step-down circuit 982 and a second power loss value during power distribution through a non-operation of the step-up circuit 980 and the step-down circuit 982. According to an embodiment of the disclosure, in case that a current from power from the battery 943 conducts the step-up circuit 980, the resistor 981, and the step-down circuit 982, the control circuit 920 may identify (or confirm or acquire) a first power loss value based on power loss at each of the step-up circuit 980, the resistor 981, and the step-down circuit 982. According to an embodiment of the disclosure, in case that a current from power from the battery 943 only conducts the resistor 981 without passing through the step-up circuit 980 and the step-down circuit 982 to be transferred to the load circuit 950, the control circuit 920 may identify (or confirm or acquire) a second power loss value based on power loss at the resistor 981.

In operation 1040, the control circuit 920 according to an embodiment may identify whether the first power loss value is smaller than the second power loss value.

In operation 1050, the control circuit 920 according to an embodiment may control the step-up circuit 980 and the step-down circuit 982 to operate when the first power loss value is smaller than the second power loss value.

In operation 1060, the control circuit 920 according to an embodiment may control the step-up circuit 980 and the step-down circuit 982 not to operate when the first power loss value is not smaller than (or is more than or equal to) the second power loss value.

Figure 11:
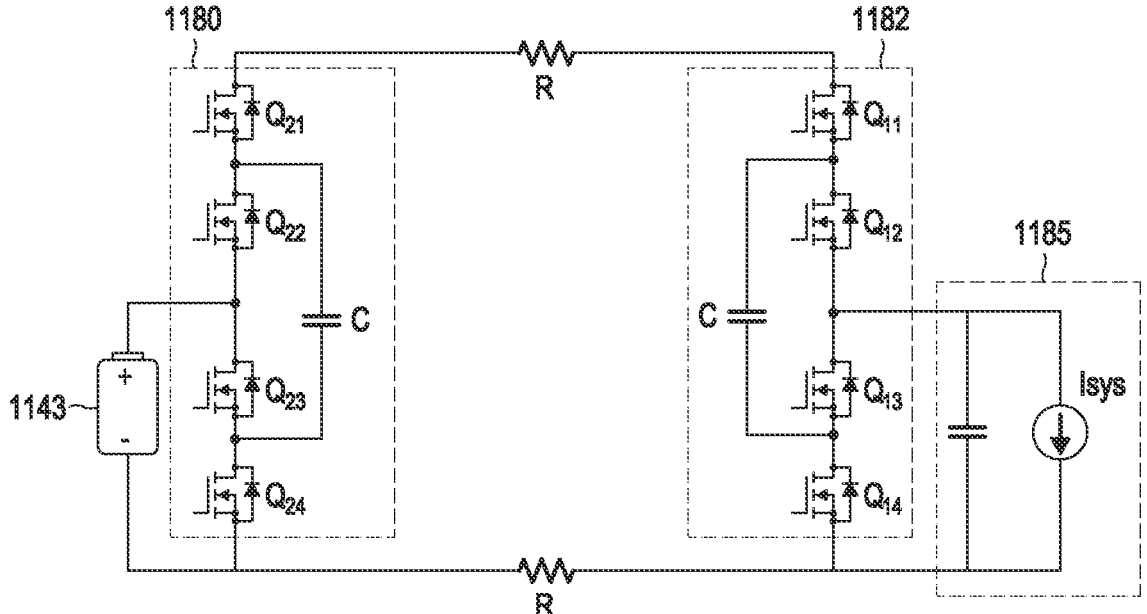
FIG. 11 is a diagram illustrating an implementation of a step-up circuit and a step-down circuit according to an embodiment of the disclosure.

FIG. 11 is a diagram illustrating an implementation of a step-up circuit and a step-down circuit according to an embodiment of the disclosure.

Referring to FIG. 11, in the wearable device 900 (e.g., the electronic device 101 in FIG. 1, the wearable device 200 in FIG. 2, the wearable electronic device 400 in FIG. 4A, the wearable device 500 in FIG. 5, or the wearable device 800 in FIG. 8) according to an embodiment of the disclosure, a step-up circuit 1180 (e.g., the step-up circuit 581 in FIG. 5, the first step-up circuit 881 in FIG. 8, or the step-up circuit 980 in FIG. 9) connected to a battery 1143 (e.g., the battery 189 in FIG. 1, the battery 243 in FIGS. 3A and 3B, the battery 365*b* in FIG. 4B, or the battery 943 in FIG. 9) may include a step-up circuit of a switched capacitor (or charge pump) manner. According to an embodiment of the disclosure, a step-down circuit 1182 (e.g., the step-down circuit 582 in FIG. 5, the first step-down circuit 882 in FIG. 8, or the step-down circuit 982 in FIG. 9) connected to an input terminal of a load circuit 1185 (e.g., the load circuit 550 in FIG. 5, the first load circuit 842 in FIG. 8, or the load circuit 950 in FIG. 9) may also include a step-down circuit of a switched capacitor (or charge pump) manner.

Figure 12:
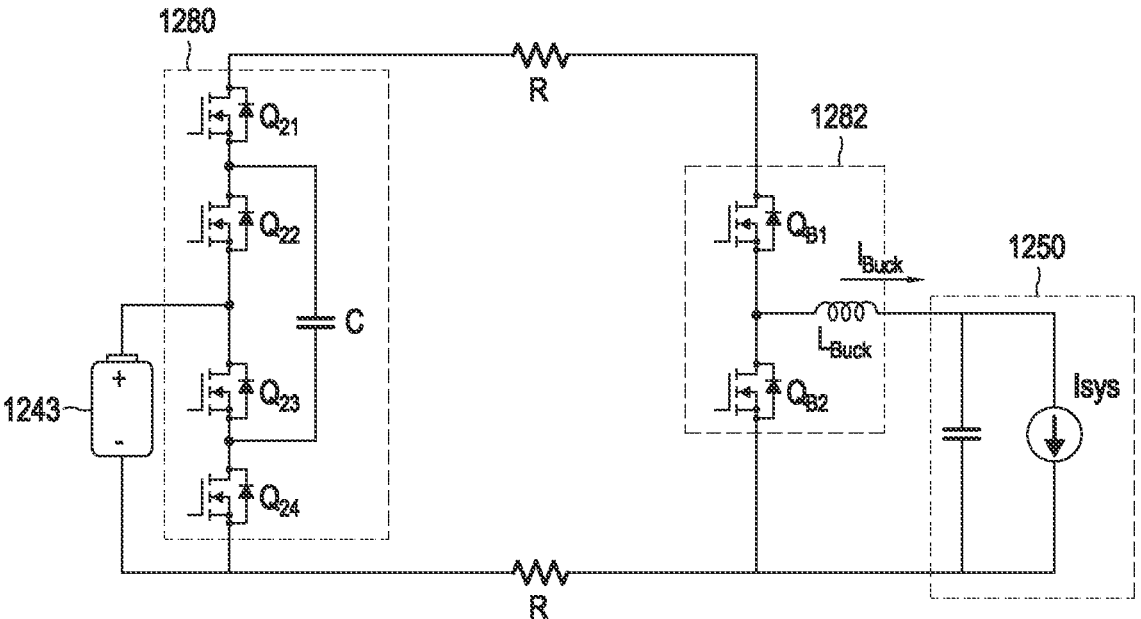
FIG. 12 is a diagram illustrating a step-up circuit and a step-down circuit being implemented in a different manner according to an embodiment of the disclosure.

FIG. 12 is a diagram illustrating a step-up circuit and a step-down circuit being implemented in a different manner according to an embodiment of the disclosure.

Referring to FIG. 12, in the wearable device 900 (e.g., the electronic device 101 in FIG. 1, the wearable device 200 in FIG. 2, the wearable electronic device 400 in FIG. 4A, the wearable device 500 in FIG. 5, or the wearable device 800 in FIG. 8) according to an embodiment of the disclosure, a step-up circuit 1280 (e.g., the step-up circuit 581 in FIG. 5, the first step-up circuit 881 in FIG. 8, or the step-up circuit 980 in FIG. 9) connected to a battery 1243 (e.g., the battery 189 in FIG. 1, the battery 243 in FIGS. 3A and 3B, the battery 365*b* in FIG. 4B, or the battery 943 in FIG. 9) may include a step-up circuit of a switched capacitor (or charge pump) manner. According to an embodiment of the disclosure, a step-down circuit 1282 (e.g., the step-down circuit 582 in FIG. 5, the first step-down circuit 882 in FIG. 8, or the step-down circuit 982 in FIG. 9) connected to an input terminal of a load circuit 1150 (e.g., the load circuit 550 in FIG. 5, the first load circuit 842 in FIG. 8, or the load circuit 950 in FIG. 9) may also include a step-down circuit using a buck converter.

Figure 13:
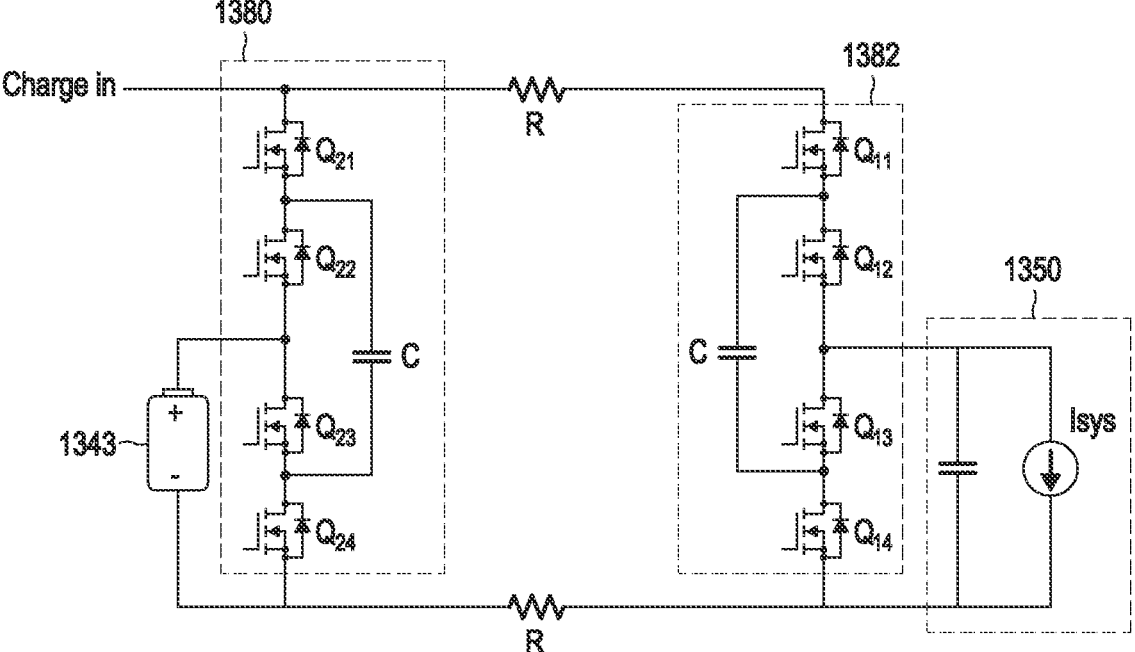
FIG. 13 is a diagram illustrating a step-down circuit being connected to a battery and a charging circuit according to an embodiment of the disclosure.

FIG. 13 is a diagram illustrating a step-down circuit being connected to a battery and a charging circuit according to an embodiment of the disclosure.

Referring to FIG. 13, in the wearable device 900 (e.g., the electronic device 101 in FIG. 1, the wearable device 200 in FIG. 2, the wearable electronic device 400 in FIG. 4A, the wearable device 500 in FIG. 5, or the wearable device 800 in FIG. 8) according to an embodiment of the disclosure, a step-up circuit 1380 (e.g., the step-up circuit 581 in FIG. 5, the first step-up circuit 881 in FIG. 8, or the step-up circuit 980 in FIG. 9) connected to a battery 1343 (e.g., the battery 189 in FIG. 1, the battery 243 in FIGS. 3A and 3B, the battery 365*b* in FIG. 4B, or the battery 943 in FIG. 9) may be connected to a charging circuit (not shown) as well and include a step-up circuit of a switched capacitor (or charge pump) manner. According to an embodiment of the disclosure, a step-down circuit 1382 (e.g., the step-down circuit 582 in FIG. 5, the first step-down circuit 882 in FIG. 8, or the step-down circuit 982 in FIG. 9) connected to an input terminal of a load circuit 1350 (e.g., the load circuit 550 in FIG. 5, the first load circuit 842 in FIG. 8, or the load circuit 950 in FIG. 9) may also include a step-down circuit of a switched capacitor (or charge pump) manner.

According to an embodiment of the disclosure, in addition to the above examples, any converter (e.g., a switched capacitor, a buck converter, or a boost converter) capable of step-up and step-down may be applied to the step-down circuit and the step-up circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to an embodiment of the disclosure, a transitory storage medium may store instructions which are configured to cause, when executed by a wearable device (e.g., the electronic device 101 in FIG. 1, the wearable device 200 in FIG. 2, the wearable device 500 in FIG. 5, the wearable device 800 in FIG. 8, or the wearable device 900 in FIG. 9), the wearable device to perform at least one operation, wherein the at least one operation may include an operation of obtaining a first power loss value while distributing power from a battery to at least one electrical component through an operation of step-down circuitry (e.g., the step-down circuit 582 in FIG. 5, the first step-down circuit 882 in FIG. 8, the fourth step-down circuit 887 in FIG. 8, or the step-down circuit 982 in FIG. 9) connected to a power input terminal of load circuitry (e.g., the load circuit 550 in FIG. 5, the first load circuit 842 in FIG. 8, the third load circuit 854 in FIG. 8, or the load circuit 950 in FIG. 9) including the at least one electrical component and configured to operate by using power supplied from the battery (e.g., the battery 189 in FIG. 1, the battery 243 in FIGS. 3A and 3B, the battery 543 in FIG. 5, or the first battery 843a in FIG. 8, the second battery 843b in FIG. 8, or the battery 943 in FIG. 9) and step-up circuitry (e.g., the step-up circuit 584 in FIG. 5, the second step-up circuit 872 in FIG. 8, the third step-up circuit 886 in FIG. 8, or the step-up circuit 980 in FIG. 9) connected to a power output terminal of the load circuitry, an operation of obtaining a second power loss value while distributing power from the battery to the at least one electrical component through a non-operation of the step-up circuitry and the step-down circuitry, and based on comparison between the first power loss value and the second power loss value, controlling the power from the battery to be distributed to the at least one electrical component through the step-up circuitry and the step-down circuitry or controlling the power from the battery to be distributed to the at least one electrical component without passing through the step-up circuitry and the step-down circuitry.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A wearable device comprising:
a battery;
load circuitry including at least one electrical component and configured to operate by using power supplied from the battery;
step-down circuitry connected to a power input terminal of the load circuitry;
step-up circuitry connected to a power output terminal of the load circuitry; and
a processor operatively connected to the step-down circuitry and the step-up circuitry,
wherein the processor is configured to:
obtain a first power loss value while distributing power from the battery to the at least one electrical component through an operation of the step-down circuitry and the step-up circuitry,
obtain a second power loss while distributing the power from the battery to the at least one electrical component through a non-operation of the step-up circuitry and the step-down circuitry, and
based on comparison between the first power loss value and a second power loss value, control the power from the battery to be distributed to the at least one electrical component through the step-up circuitry and the step-down circuitry or control the power from the battery to be distributed to the at least one electrical component without passing through the step-up circuitry and the step-down circuitry.
2. The wearable device of claim 1, wherein the processor is further configured to:
control the power from the battery to be distributed to the at least one electrical component through the step-up circuitry and the step-down circuitry in case that the first power loss value is smaller than the second power loss value, and
control the power from the battery to be distributed to the at least one electrical component without passing through the step-up circuitry and the step-down circuitry in case that the first power loss value is not smaller than the second power loss value.
3. The wearable device of claim 1, wherein the at least one electrical component comprises a light output module, a circuit board, a speaker module, a microphone module, or a camera module.
4. The wearable device of claim 1, wherein the load circuitry further comprises:
a first connector;
a flexible printed circuit board (FPCB); and
a second connector.

5. The wearable device of claim 1, wherein the step-down circuitry comprises a switched capacitor converter or a buck converter.

6. The wearable device of claim 1, wherein the step-up circuitry comprises a switched capacitor converter or a boost converter.

7. The wearable device of claim 1, wherein the processor is further configured to, based on a first power loss curve according to a current while distributing power from the battery to the at least one electrical component through the operation of the step-down circuitry and the step-up circuitry and a second power loss curve according to a current while distributing power from the battery to the at least one electrical component through then on-operation of the step-down circuitry and the step-up circuitry:

operate the step-down circuitry and the step-up circuitry at a current greater than or equal to a designated current value based on a designated current value at a point where the first power loss curve and the second power loss curve intersect, and not operate the step-down circuitry and the step-up circuitry at a current less than the designated current value.

8. The wearable device of claim 1, further comprising memory, wherein the memory is configured to store the first power loss value and the second power loss value.

9. The wearable device of claim 1, further comprising a step-up circuitry connected to an output terminal of the battery.

10. A power distribution method in a wearable device, the method comprising:

obtaining a first power loss value while distributing power from a battery to at least one electrical component through an operation of step-down circuitry connected to a power input terminal of load circuitry including the at least one electrical component and configured to operate by using power supplied from a battery and step-up circuitry connected to a power output terminal of the load circuitry;

obtaining a second power loss value while distributing the power from the battery to the at least one electrical component through a non-operation of the step-up circuitry and the step-down circuitry; and based on comparison between the first power loss value and the second power loss value, controlling the power from the battery to be distributed to the at least one electrical component through the step-up circuitry and the step-down circuitry or controlling the power from the battery to be distributed to the at least one electrical component without passing through the step-up circuitry and the step-down circuitry.

11. The method of claim 10, further comprising:

controlling the power from the battery to be distributed to the at least one electrical component through the step-up circuitry and the step-down circuitry in case that the first power loss value is smaller than the second power loss value; and controlling the power from the battery to be distributed to the at least one electrical component without passing through the step-up circuitry and the step-down circuitry in case that the first power loss value is not smaller than the second power loss value.

12. The method of claim 10, wherein the at least one electrical component comprises a light output module, a circuit board, a speaker module, a microphone module, or a camera module.

13. The method of claim 10, wherein the load circuitry further comprises:

a first connector;

a flexible printed circuit board (FPCB); and a second connector.

14. The method of claim 10, wherein the step-down circuitry comprises a switched capacitor converter or a buck converter.

15. The method of claim 10, wherein the step-up circuitry comprises a switched capacitor converter or a boost converter.

16. The method of claim 10, further comprising:

based on a first power loss curve according to a current while distributing power from the battery to the at least one electrical component through the operation of the step-down circuitry and the step-up circuitry and a second power loss curve according to a current while distributing power from the battery to the at least one electrical component through the non-operation of the step-down circuitry and the step-up circuitry:

operating the step-down circuitry and the step-up circuitry at a current greater than or equal to a designated current value based on a designated current value at a point where the first power loss curve and the second power loss curve intersect; and not operating the step-down circuitry and the step-up circuitry at a current less than the designated current value.

17. The method of claim 10, further comprising:

storing, in memory, the first power loss value and the second power loss value.

18. The method of claim 10, wherein the wearable device further comprises a step-up circuitry connected to an output terminal of the battery.

19. One or more non-transitory computer-readable storage media storing computer-executable instructions that, when executed by a wearable device, configure the wearable device to perform operations comprising:

obtaining a first power loss value while distributing power from a battery to at least one electrical component through an operation of step-down circuitry connected to a power input terminal of load circuitry including the at least one electrical component and configured to operate by using power supplied from the battery and step-up circuitry connected to a power output terminal of the load circuitry;

obtaining a second power loss value while distributing power from the battery to the at least one electrical component through a non-operation of the step-up circuitry and the step-down circuitry; and based on comparison between the first power loss value and the second power loss value, controlling the power from the battery to be distributed to the at least one electrical component through the step-up circuitry and the step-down circuitry or controlling the power from the battery to be distributed to the at least one electrical component without passing through the step-up circuitry and the step-down circuitry.

20. The one or more non-transitory computer-readable storage media of claim 19, further comprising:

controlling the power from the battery to be distributed to the at least one electrical component through the step-up circuitry and the step-down circuitry in case that the first power loss value is smaller than the second power loss value; and controlling the power from the battery to be distributed to the at least one electrical component without passing through the step-up circuitry and the step-down circuitry in case that the first power loss value is not smaller than the second power loss value.

* * * * *